United States Patent [19]

Morris et al.

[11] 4,072,200

[45] Feb. 7, 1978

[54] SURVEYING OF SUBTERRANEAN MAGNETIC BODIES FROM AN ADJACENT OFF-VERTICAL BOREHOLE

[76] Inventors: Fred J. Morris, Rte. 7, Box 718-E, Austin, Tex. 78703; Robert L. Waters, 11901 Springhill Drive, Austin, Tex. 78753; George F. Roberts, McMara Road, Austin, Tex. 78758

[21] Appl. No.: 685,936

[22] Filed: May 12, 1976

[51] Int. Cl.² .............................................. E21B 47/02
[52] U.S. Cl. ............................................. 175/45; 324/8
[58] Field of Search ................ 175/40, 45, 57, 61, 175/62; 33/302, 304, 313; 324/8, 10, 43

[56] References Cited

U.S. PATENT DOCUMENTS

| | | | |
|---|---|---|---|
| 2,359,894 | 10/1944 | Brown et al. | 324/8 |
| 2,407,202 | 9/1946 | Vacquier | 324/8 X |
| 2,664,542 | 12/1953 | Lynn | 324/8 |
| 3,263,161 | 7/1966 | Ruddcock et al. | 324/8 |
| 3,406,766 | 10/1968 | Henderson | 175/61 |
| 3,712,391 | 1/1973 | Coyne | 175/45 |
| 3,725,777 | 4/1973 | Robinson et al. | 324/8 |
| 3,731,752 | 5/1973 | Schad | 175/45 |
| 3,745,446 | 7/1973 | Norris | 324/8 X |
| 3,748,574 | 7/1973 | Mitchell et al. | 324/10 X |
| 3,853,185 | 12/1974 | Dahl et al. | 175/45 |
| 3,907,045 | 9/1975 | Dahl et al. | 175/45 |
| 3,965,412 | 6/1976 | Yungul | 324/8 |
| 3,965,413 | 6/1976 | Yungul | 324/8 |

Primary Examiner—Ernest R. Purser
Assistant Examiner—Richard E. Favreau

[57] ABSTRACT

A method and apparatus for performing a surveying operation to locate a target subterranean ferromagnetic body having remanent or impressed magnetization. The surveying operation is conducted from an off-vertical borehole adjacent the target magnetic body using magnetic field sensing apparatus, and involves determining the range and direction of the subterranean target with respect to the location of the magnetic field sensing apparatus. Target direction is determined by measuring three magnetic field components and resolving the measured components into a resultant vector. Target range is determined by measuring total magnetic field intensity and target body magnetic field intensity gradient in the direction of the off-vertical borehole. Both static and time-varying fields may be detected by the subsurface apparatus. The methods and apparatus disclosed may be used in such diverse areas as the location of ore deposits, guidance systems for drilling off-vertical wells to intersect a previously drilled well, and location metallic objects underwater.

50 Claims, 21 Drawing Figures

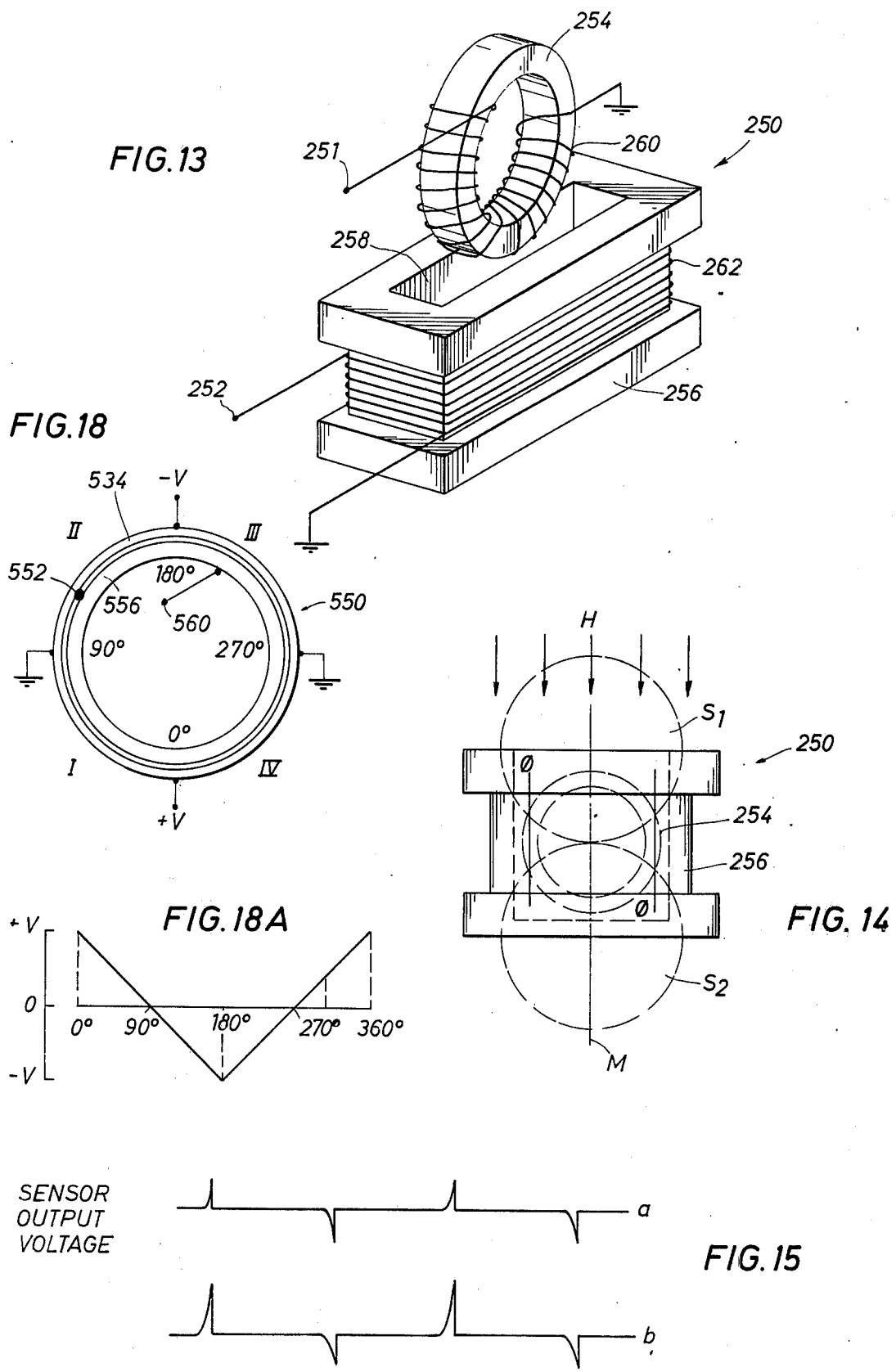

SURVEYING OF SUBTERRANEAN MAGNETIC BODIES FROM AN ADJACENT OFF-VERTICAL BOREHOLE

BACKGROUND OF THE INVENTION

The present invention relates, in general, to surveys for locating target subterranean bodies, and more particularly to directional subsurface drilling of off-vertical wells using a magnetometer instrument to survey from a borehold the direction and range to a predetermined subsurface target and provide information for guiding futher drilling.

In drilling an oil or gas well, it is often desirable to drill the hole as nearly as possible in a true vertical course. Realizing that a well cannot be drilled that is exactly vertical, at the conclusion of the drilling of the well, it is routine practice to have a logging survey made in order to determine the deviation off-vertical of the well at various depths. The survey involves, in one case, the operation of an instrument, as it is raised or lowered through the borehole, to register changes in its orientation off-vertical using the earth's magnetic field and gravity as references. In another case, changes with respect to a gyroscopic reference are recorded. Instruments of this type are well known to those skilled in art.

When a well "blows out" or goes out of control, it is desirable to intersect that well at a point above the high pressure producing formation in a suitably permeable zone, so as to allow fluid flow in order to plug the borehole and eliminate the blowout. Such a relief well is drilled in order that cement or some similar material can be pumped down to kill the blowout. In wells having large flow rates, and particularly those which have caught fire as well, it is required that an off-vertical well be drilled to intersect the first well to provide a path to the point where shutoff is desired to be made.

Generally speaking, off-vertical well drilling to intercept a previously drilled well can be done fairly accurately if the location of the target is known with sufficient accuracy. However, due to the lack of accuracy in the logging of the off-vertical deviations of the first well, the exact position of the desired target point along the blown out well is generally not accurately known. Typically, the location will be known only to within about ten to forty feet. In view of the fact that the drill string being used to drill the off-vertical relief well cannot be turned on a sharp radius, and thus must be set up directionally at a point far from the first well, it is difficult to precisely intersect the first well. Several attempts may be required to effect interception. If, however, the target location along the first well site were able to be accurately pin-pointed, drilling could proceed more readily to intersection therewith. This, of course, is generally not the case.

Therefore, to expeditiously drill off-vertical relief wells to intersect a first well in order to shut off a well out of control, it is necessary to employ the technique of directional drilling. Directional drilling involves controlling the course of a borehole by using surface and subsurface instruments to direct the drilling toward a specific target. Direction recording instruments are used to determine the desired direction of drilling with deflecting tools and/or directional methods being used down hole to control the downward course of the well.

One approach to direction recording instruments for use in off-vertical well drilling is a system in which a magnetometer is located in a target well with a magnetic field generator, such as an electromagnet, being located in a second well some distance from the first. The electromagnet is carried by a drill string which is to be guided in accordance with the measurements of the field generated at the target well as obtained by the magnetometer. These measurements provide an indication of the direction of the generated field with the changes in the measured components providing an indication of the direction of travel of the drill with respect to the target magnetometer. This technique of off-vertical well drilling is taught in the prior art by U.S. Pat. Nos. 3,285,350 and 3,406,766 to J. K. Henderson.

Another approach to directional drilling of off-vertical wells is that of U.S. Pat. No. 3,725,777 to Robinson et al. The approach disclosed therein provides a method for locating a previously drilled well which is cased with a material having a remanent magnetization. Magnetometers measure the total strength of the existing magnetic field which is a combination of the magnetized casing plus the earth's field. Possible locations of the previously cased well are calculated; and assuming the strength and direction of the earth's field, the strength and direction of the field contributed by the cased well can be determined. The distance and direction to the cased well are determined by machine calculations involving a least squares fit analysis.

Another approach involving the determination of the distance between a cased well and a directional well is that of U.S. Pat. No. 3,748,574 to Mitchell et al, which discloses a technique using resistivity measurements. In this technique, the expected resistivity of the formations surrounding the off-vertical well is determined in calculations made of the anticipated reduction is resistivity caused by the presence of the casing. A nomogram is prepared by plotting the calculated reduction versus the assumed distances for each calculated formation resistivity. The measured resistivity caused by the casing in the distance between the two wells is then obtained form the nomogram.

Generally, guidance systems for off-vertical well drilling will include subsurface magnetic field direction sensing devices and surface recording instruments for displaying the information concerning the magnetic field being sensed. The subsurface magnetic field direction sensing device is usually some type of magnetometer which detects the direction of emanation of the magnetic field of the target and of the earth, with the outputs therefrom being connected to the surface recording instruments.

Typically, the magnetic field direction sensing device will be a fluxgate magnetometer having a low reluctance magnetically directionally sensitive loop with drive coils and sense coils wound thereon. An oscillator produces AC current flow in the parallel drive coils which developes an alternative magnetic flux in the loop. When the loop is not subject to any ambient magnetic field, the voltage induced in each sense coil will be equal and opposite, so that upon summing of the voltages no output is obtained. When the magnetic loop is subjected to an ambient magnetic field having lines of force including a vector component parallel to the loop, the balance between the sense coils is disturbed and an AC voltage is produced at the output. Since the magnetic field direction sensing device will be sensitive to the earth's magnetic field, some type of neutralizating technique is usually employed to adjust the flux being created in the loop to remove the influence of the earth's field and drive the output voltage of the sense coils to zero. Magnetometers of this type are sensitive only to magnetic fields having a vector component parallel to the core and is, therefore, not sensitive to magnetic fields perpendicular to the length of the loop.

In order to establish the direction of emanation of the magnetic field, it has been usual in prior magnetometer systems to utilize two mutually perpendicular fluxgate magnetometers defining X and Y coordinate vectors of the detected field. The vectors are generally resolved electronically and displayed on some type of surface recording instrument. Typically, the surface recording instrument will serve to resolve the vector components of the sensed magnetic field in a conventional manner using rectangular coordinates, as by plotting the component amplitudes and solving graphically for the actual field direction in the plane of the sensors. Representative of the foregoing described magnetic field sensing devices and magnetometer systems in Schad, U.S. Pat. No. 3,731,752. In this reference, it is further suggested that a third magnetometer could be used to measure X, Y and Z magnetic field components (Col. 4, line 55, et seq.).

Prior magnetometer guidance systems for off-vertical well drilling, such as that described above, position the magnetic field direction sensing device in an existing well that is to be intersected by a second well. Thus, the magnetometer becomes the target with the electromagnet, creating a detectable magnetic field. The requirement that a magnetic field generator be used to set up a detectable magnetic field can present insurmountable problems in those situations, such as a blowout well, wherein it is not possible to place a magnetometer device or a field generating source in the target well.

Thus, it is desirable to have a surveying system for guiding off-vertical well drilling which is capable of locating a subsurface ferromagnetic target such as a length of drill string, a drill tool or well casing in the target well. Such ferromagnetic material will demonstrate and possess remanent magnetization since most drill pipe and well casing is electromagnetically inspected before it is installed, leaving a residual magnetic field in the casing. Even were this not the case, the magnetic influence of the earth's field will induce some magnetization which may be detected in a ferromagnetic material in the target well. It is further desirable to have a surveying system that provides not only the direction of the subsurface target from the borehole, but provides the range to the target also.

SUMMARY OF THE INVENTION

In accordance with the instant invention, there is provided a novel method of surveying subterranean magnetic and electrically conductive bodies of material from an adjacent off-vertical borehole. In one aspect, the instant invention provides a method of directional subsurface drilling of an off-vertical relief well borehole to intersect an adjacent well having remanent magnetization. In another particular aspect, the instant invention provides a method of directional subsurface drilling of an off-vertical relief well borehole to intersect an adjacent well having a magnetic field set up around it by the flow of current through the well casing. In yet another particular aspect, the instant invention provides a method of directional subsurface drilling of an off-vertical relief well borehole to intersect an adjacent well having an electric field emanating therefrom caused by the application of an electric potential to the well casing.

The instant invention also provides a surveying system suitable for locating a subterranean body exhibiting either a static magnetic field, or a time-varying magnetic or electric field. Specifically, the instant invention provides subsurface field sensing apparatus having field sensors which detect and measure fields emanating from the subterranean body, and surface instruments for recording and processing the readings made downhole. In a specific application, the instant invention provides a surveying system which may be particularly advantageously used in connection with the drilling of underground relief wells to intersect a previously drilled well, particularly one that is out of control.

The surveying method of the instant invention involves the determination of both the direction of the target subterranean body with respect to a particular underground location, and the range from that location to the target subterranean body. In the case of a magnetic body having remanent magnetization, and therefore a static field, the determination of the direction to the target magnetic body is made by measuring three magnetic field components, and resolving those components into a resultant vector in accordance with conventional vector analysis calculations. Range determination is made by measuring the total magnetic field intensity and the gradient, in the direction of the borehole, of the field of the magnetized target body, and then using these measurements to determine the range. It is to be recognized that the total magnetic field will be that resulting from a combination of the field from the magnetized target body plus the field of the earth.

In accordance with the present invention, the measurements of a component of magnetic field intensity and target field gradient are made using two axially displaced magnetic field sensors separated by a known distance. The average of the measurements of the sensors yields the measurement of a component of magnetic field intensity over the separation between the sensors, and the difference $\Delta H$ in the readings of the two sensors divided by the distance of separation $\Delta r$ yields $\Delta H/\Delta r$ which is the average magnetic field intensity gradient over the separation between the displaced sensors. Measurements at a minimum of three locations along the borehole are required, thereby defining two separations over which average total magnetic field intensity and average target field intensity gradient measurements are made. Ratios of magnetic field intensity to target magnetic field intensity gradient are calculated for the two defined separations, using the corresponding values of magnetic field intensity and gradient determined for each of the defined separations. The calculated ratios are then substituted in an equation that is derived from the general expression relating magnetic field intensity of a body and the distance away from the body that an observation point is established. The general equation being $H=Kr^{-n}$, where $K$ is a constant dependent upon properties of the magnetic body and $n$ is the fall-off rate with distance $r$ of the intensity of the magnetic disturbance, also dependent upon the particular characteristics of the target magnetic body.

In the situation where the target to be located exhibits a time-varying magnetic field, a slightly different approach must be employed in the surveying operation. A time-varying magnetic field set up about a subterranean magnetic body by virtue of an alternating current being applied to the body will result in a circularly distributed pattern of equal intensity points around the axis of the target magnetic body. The time-varying magnetic field sensor of the field sensing apparatus is designed to have a maximum response when aligned tangentially to the magnetic flux lines that follow a circular path, and have a minimum response when the sensor is aligned perpendicularly to the circular magnetic field lines. Therefore, by detecting the time-varying field set up around the target and selecting the orientation of the instrument such that a minimum response is detected on the time-varying magnetic field sensor, the direction to the target magnetic body may be determined as being in the direction of the axis of the time varying magnetic field sensor. The range to the target magnetic body may be determined in accordance with the technique employed with respect to static magnetic fields; however when phase-lock detection is employed using a sample of the current source as a reference, only a single magnetic field sensor need be used with measurements being made at a minimum of three locations along the borehole at known distances of separation.

In the situation where a target subterranean body does not exhibit a detectable alternating magnetic field, but does have an alternating electric field existing about it due to the application of an electric potential to the body, electric field probe sensors may be utilized to detect and measure the electric field gradient. Direction to the target body is determined by orienting the instrument in which the electric field sensor is placed until the sensor shows a maximum voltage gradient, as when the electrode sensors are aligned in the direction of the target body. Range to the target electrically conductive body is made in a manner similar to that for the other two cases; however, electric field intensity and electric field gradient are used rather than magnetic field intensity and magnetic field intensity gradient.

A method of directional subsurface drilling of a first borehole to intersect an adjacent second borehole containing a ferromagnetic target, comprises the steps of measuring the components of the earth's magnetic field along orothogonal axes at a first location along the relief borehole sufficiently remote from the target to be unaffected by any magnetic field of the target; measuring components of the total magnetic field (earth plus target) along orthogonal axes at a second location along the relief borehole sufficiently proximate the target to detect magnetic effects of the target; determining the direction of the magnetic field of the target from the second location; measuring the component of the total field in the direction of the axis of the relief borehole at a plurality of locations in the relief borehole to determine the gradient of the target field in the direction of the axis of the relief borehole; determining the range of the target from one of the plurality of locations; and orienting the course of drilling of the relief borehole in the direction of the target magnetic field from a position in the relief borehole from which the second well may be conveniently intercepted. In a more specific method, directional subsurface drilling also includes periodically interrupting the drilling of the off-vertical relief well borehole to redetermine the direction of greatest increase in magnetic field intensity followed by a reorienting of the course of drilling of the first borehole.

The apparatus for conducting underground surveying to locate, in terms of both range and direction, a target subterranean magnetic body includes subsurface field sensing apparatus comprising: an outer housing; a pair of mutually perpendicular radial magnetic field sensors disposed along the frame; and a pair of aligned, axial magnetic field sensors spaced apart a predetermined separation along the frame and perpendicular to the radial field sensors, which axial and radial magnetic sensors define an X-Y-Z coordinate axis system.

In addition, a surveying system in accordance with the present invention further includes surface data handling and data processing apparatus which comprises: circuitry for receiving the output signals from the sensors in the subsurface field sensing apparatus, which circuits condition and digitize the received signal; a digital multiplexer circuit for routing the multiple channels of data onto a single data bus; and a programmable calculator connected to the data bus and receiving the digitized data. If time-varying electric fields are being detected, with the subsurface field sensing apparatus providing A.C. output signals, the input circuitry would further comprise AC-to-DC converters disposed ahead of the signal conditioning amplifiers, or in the alternative, comprise synchronous detectors disposed ahead of the signal conditional amplifiers. Both the AC-to-DC converter and the synchronous detector convert the A.C. signals to a D.C. signal suitable for conditioning and digitizing. As an alternative to digital processing, the sensor output signals, after conditioning, may be applied to a strip chart recorder and/or a digital voltmeter.

These and other aspects of this invention will be discussed in greater detail in the description below.

BRIEF DESCRIPTION OF THE DRAWINGS

A typical embodiment of the instant invention is illustrated in the attached drawings, which drawings are to be considered in connection with the detailed description that follows. In the drawings, like reference numerals designate identical or corresponding parts throughout the several views.

In the drawings:

FIG. 13 is a perspective diagram of a magnetic sensor core element suitable for use in conjunction with the magnetic field sensor circuitry of FIG. 12;

FIG. 14 is a side view of the sensor core element of FIG. 13 with its response pattern visualization imposed thereon;

FIGS. 15 and 15A illustrate the signals to be expected from the output terminals of the sensor core element;

FIG. 18 is an illustrative diagram of a suitable embodiment for the vertical sensor shown in the block diagram of FIG. 8;

FIG. 18A is a plot of the output response of the vertical sensor device of FIG. 18.

DESCRIPTION OF THE PREFERRED EMBODIMENT

A. GENERAL THEORY

The general theory upon which the method and apparatus of the present invention are based is that generally descriptive of and applicable to magnetic and electric fields. The principal focus of the present invention is, however, on the utilization of magnetic fields existing about and emanating from a subsurface target source.

The present invention utilizes the characteristics of the magnetic field of the earth and of a target magnetic source to provide information from which the target range and direction with respect to subsurface magnetic sensing apparatus can be determined. Orientation of the subsurface magnetic sensing apparatus located in the borehole being drilled is determined through referencing with respect to the earth's magnetic field, a known quantity both as to intensity and dip angle at a particular location on the earth.

Figure 1:
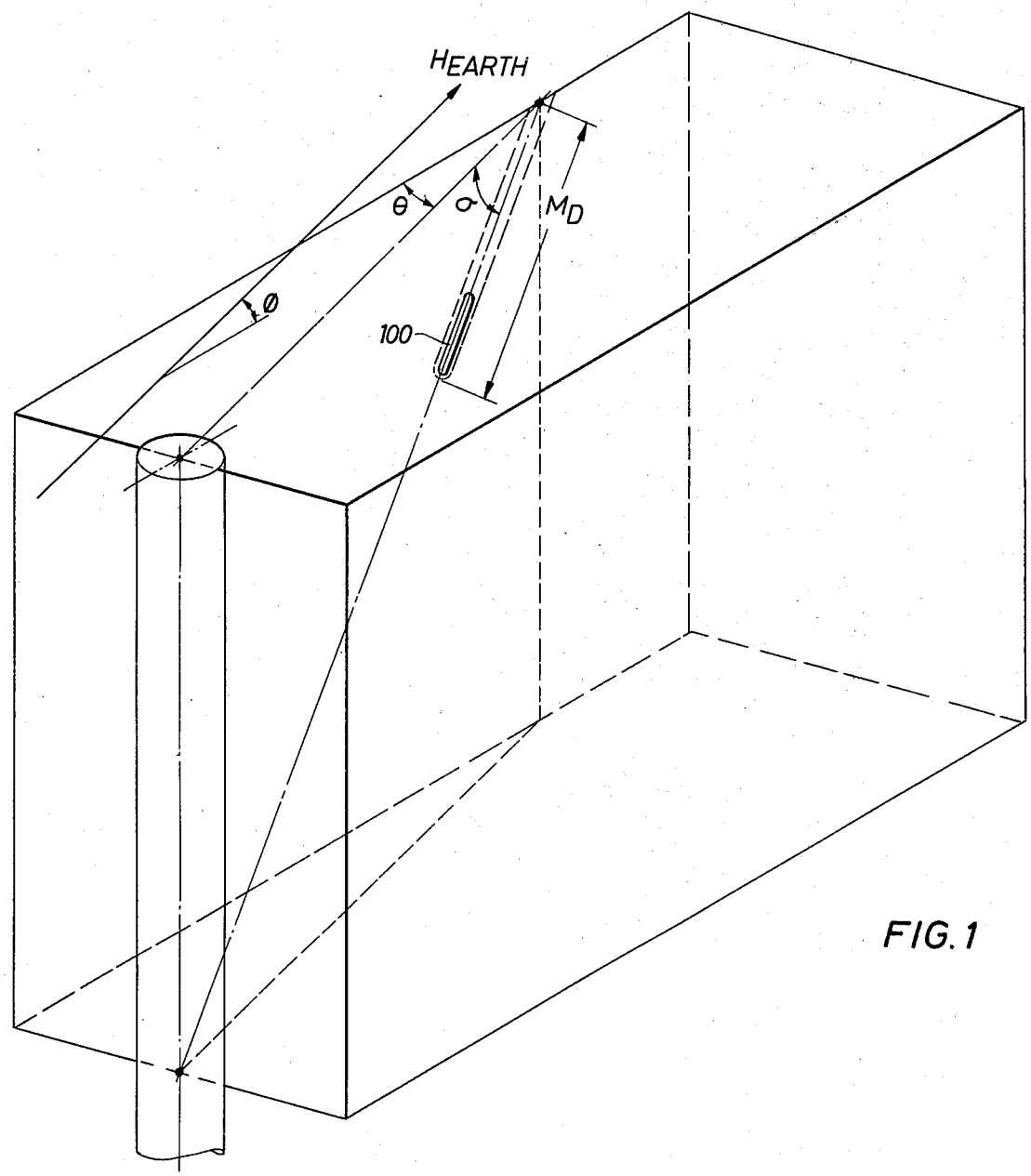
FIG. 1 is a perspective diagram of the subsurface field sensing apparatus in a borehole adjacent a cased well that is desired to be intersected with the borehole.

FIG. 1 illustrates one application to which the methods and apparatus of the present invention can be applied, that application being the drilling of a directional relief well to intercept a previously drilled well.

1. Target Range

Large pieces of magnetic material, such as magnetized casing or drill string in a borehole, can create anomalies in the earth's magnetic field. An anomaly of this sort will appear as a magnetic field of intensity H superimposed on the earth's magnetic field. The general form of the expression for the magnetic field as a function of distance from the anomaly is given by:

$$H = KM/r^n \quad (1)$$

where $K$ is a constant dependent upon such properties as magnetic susceptibility of the surrounding medium, $M$ is the magnetic moment of the magnetic body, and $n$ is the fall-off rate with distance, $r$, of the magnetic field intensity $H$ of the body.

Differentiating the above expression yields the rate of change of the magnetic field intensity with respect to radial position from the center of the magnetic body. The derivative is:

$$dH/dr = \frac{-nKM}{r^{n+1}} \quad (2)$$

and expresses a vector quantity that may be referred to as the gradient of H, or grad H, in the radial direction. By forming the ratio of H/dH, an expression results involving only the range, $r$, to the magnetic body and the fall-off rate $n$. That expression is:

$$\frac{H}{dH/dr} = \frac{(KM)}{(r^n)} \frac{(r^{n+1})}{(-nKM)} = \frac{-r}{n} \quad (3)$$

If two measurements are made such that $$\frac{H_1}{dH_1/dr} = \frac{-r_1}{n} \text{ and } \frac{H_2}{dH_2/dr} = \frac{-r_2}{n},$$

then upon division, $$\frac{H_1}{H_2} \frac{(dH_2/dr)}{(dH_1/dr)} = \frac{r_1}{r_2}, \quad (4)$$

or in the alternate, $$\frac{H_2}{H_1} \frac{(dH_1/dr)}{(dH_2/dr)} = \frac{r_2}{r_1}$$

This derivation indicates that the range, $r$, of an observation point in space from the magnetic body can be determined from measurements of the magnetic field intensity taken at three or more points along a substantially straight line representing the axis of the relief well to determine the average gradient of the magnetic field between those points.

The values of H and $dH/dr$ for the above equations can be measured using two aligned magnetic field sensors displaced a fixed distance apart. For greater accuracy, an average of the magnetic field intensities measured on two magnetic sensors can be used for the value of H. The difference $\Delta H$ in the readings between the two magnetic sensors divided by the separation $\Delta r$ between them yields $\Delta H/\Delta r$, which is the average gradient of the magnetic intensity H over the separation and a good approximation of $dH/dr$.

Figure 2:
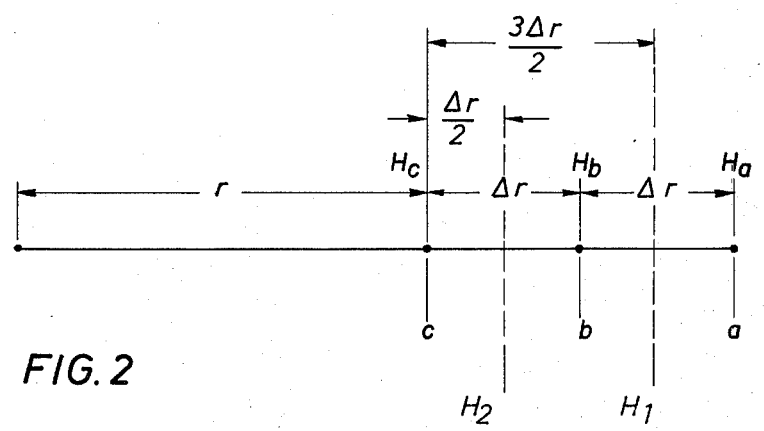
FIG. 2 is a diagram relating to the "ranging" technique and illustrating the discussion associated therewith.

Referring to FIG. 2, a diagram is presented therein illustrating the foregoing discussion. In order to obtain two measurements of H and $\Delta H/\Delta r$ for substitution in the above equations, it is necessary to make at least three measurements of the magnetic field intensity. Therefore, to obtain $H_1$, the magnetic field intensity at points $a$ and $b$ must be measured and averaged. The separation of the magnetic sensors defines points $a$ and $b$, with $\Delta r$ being the distance therebetween. The approximation of $dH_1/dr$ is obtained by dividing the difference in the measured field intensities at points $a$ and $b$, designated $\Delta H_1$, by the separation $\Delta r$. To obtain $H_2$, the displaced magnetic sensors are moved to a new location along the common axis, with the sensor previously at point $a$ moving to point $b$ and the sensor previously at point $b$ moving to point $c$. Similar to the determination of $H_1$, the magnetic field intensity is measured at points $b$ and $c$ with the value of $H_2$ being the average of the two measurements. The approximation of $dH_2/dr$ is obtained by determining the difference between the intensities at points $b$ and $c$, $\Delta H_2$ and dividing that quantity by the separation, $\Delta r$. The value of $r_1$ in equation $\Delta$ above is found in FIG. 2 to be $r_1 = r + 3\Delta r/2$, and the value of $r_2 = r + \Delta r/2$. Measurements would be repeated at intervals as the sensors are advanced along a path to update and monitor the closing of the range. Ranging accuracy can be improved with the measurements being made at intervals that are closer together, approaching a continuous recording.

By substituting the above determinations into equation 4, the following equation $$\frac{H_2}{H_1} \frac{(\Delta H_1/\Delta r)}{(\Delta H_2/\Delta r)} = \frac{r + \frac{\Delta r}{2}}{r + \frac{3\Delta r}{2}} \quad (5)$$

results, which can be simplified to $$\frac{H_2 \Delta H_1}{H_1 \Delta H_2} = \frac{r + \Delta r/2}{r + 3\Delta r/2} \quad (6)$$

and rewritten to express the range, $r$, as follows:

$$r = \frac{\frac{3\Delta r \, H_2 \Delta H_1}{2 H_1 \Delta H_2} - \frac{\Delta r}{2}}{1 - \frac{H_2 \Delta H_1}{H_1 \Delta H_2}} \quad (7)$$

Assuming that $\Delta r/2$ is insignificant when compared to $r$, the equation reduces to $$r = \frac{\frac{1.5\Delta r}{H_1 \Delta H_2}}{\frac{H_2 \Delta H_1}{} - 1} \quad (8)$$

where
$H_1 = (H_b + H_a)/2$
$H_2 = (H_c + H_b)/2$
$\Delta H_1 = H_b - H_a$
$\Delta H_2 = H_c - H_b$ The range will be expressed in whatever dimensions the separation $\Delta r$ is measured. Typically, it would be in feet or meters.

Once the range, $r$, is determined, the fall-off rate, $n$, may be ascertained to indicate the character of the magnetic target. The value of $n$ is obtained by solving the equation $$n = r \frac{dH/dr}{H}, \text{ or the approximation formula}$$

$$n = r \frac{\Delta H_1/\Delta r}{H_1}$$

It is to be appreciated that the ranging technique described above can also be carried out with a single magnetic sensor. If only one sensor is used, the measurements of magnetic field intensity must be correlated with the distance down the borehole (the $\Delta r$ distance) at which they are taken in order to ascertain the separation between the points at which the measurements are made. This can be done by suspending the sensor with a cable that is marked to indicate its length. The separation is required to permit the average gradient of the magnetic field, $\Delta H/\Delta r$, to be determined.

It is to be pointed out that ranging with a single magnetic sensor will not, because of practicalities, be as accurate as with two sensors of fixed separation. Most important of the practical limitations on using one sensor is the inability to be sure that the sensor is oriented the same at all measurement locations. It is a basic premise of the ranging technique that the field intensity measurements be made along a straight line and that the magnetic field sensors not change in orientation.

2. Target Direction

Magnetized structures of various dimensions and configurations create magnetic fields having a characteristic emanation pattern. For example, a magnetized elongate structure forming a magnetic dipole will have magnetic flux lines emanating from one end to the other. However, if the structure is sufficiently long and the point of observation is moved proximate one end, the magnetic body will appear to be one emanating from an endless linear magnetic source in the form of outwardly, radially directed flux lines extending from the elongate magnetic structure. The magnetic field characteristics can be utilized through appropriate detection by magnetic field sensors, with proper interpretation of the measurements and knowledge of the earth's field, to determine direction to the magnetic body from some point in space.

Figure 3:
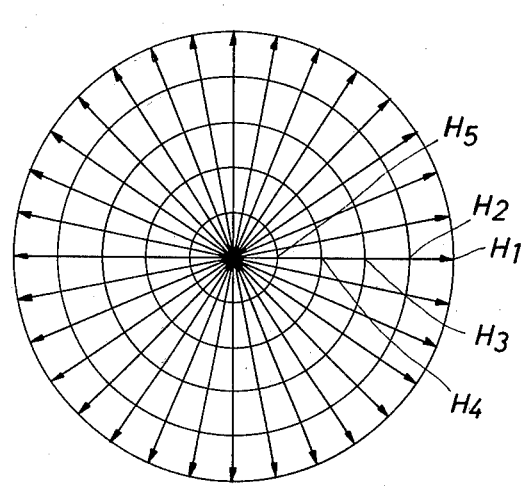
FIGS. 3 and 4 are diagrams of the pattern of emanation of the magnetic field existing in connection with the cased well in FIG. 1.
Figure 4:
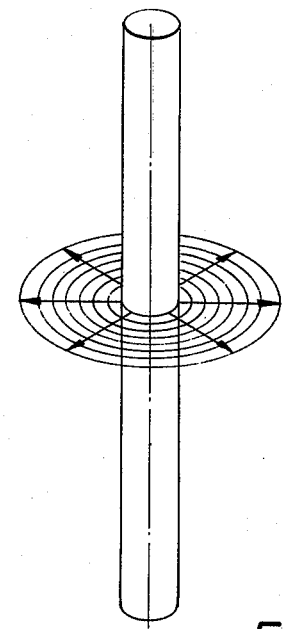
Figure 6:
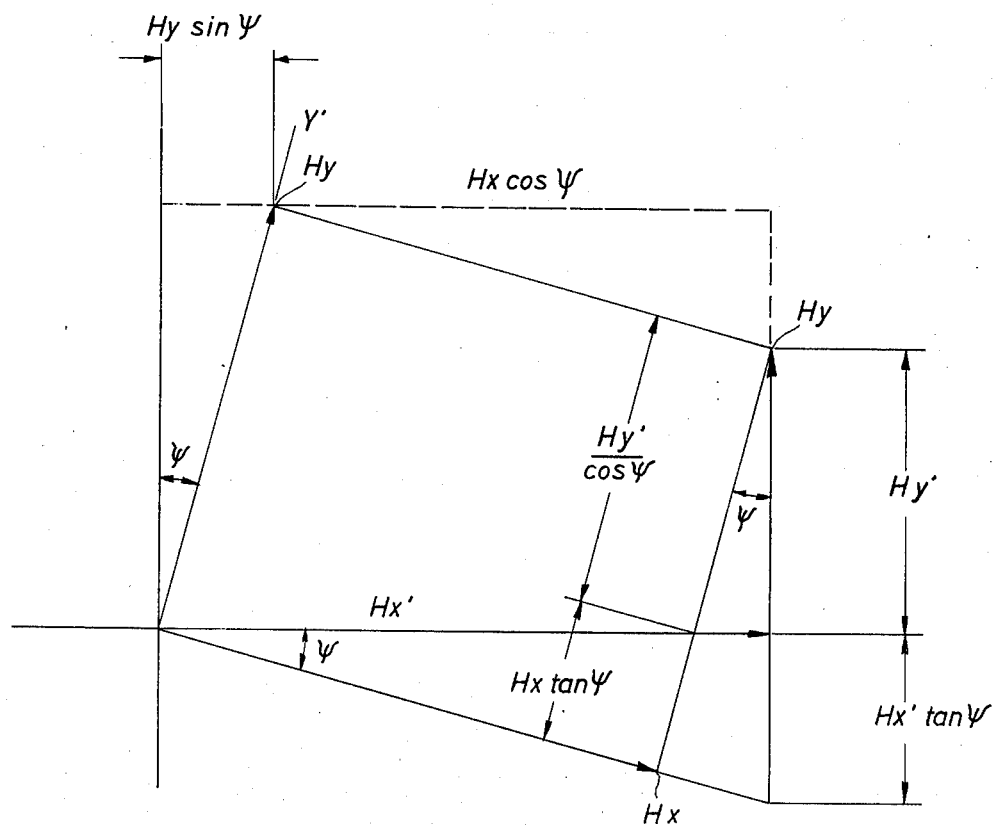
FIG. 6 is a vector diagram relating to the development of correction factors to be used in connection with the calculation of borehole elevation and azimuth correction angles.

The usual situation confronted in directional subsurface drilling is that in which a well casing or a length of drill string is the magnetic body to be detected, as in FIG. 1. With the elongate configuration creating a dipole and with the observation point in space being located at a distant point far away from the structure, the magnetic field emanating therefrom will appear to be a radially directed field, as illustrated in FIG. 3 and FIG. 4, with an intensity given by $H = KM/r^2$. Utilizing a set of three magnetic sensors arranged orthogonally, the earth's magnetic field and the target's field can be detected and expressed as three components. Since the earth's magnetic field is of a known intensity and direction, its contribution in the readings of the three sensors can be subtracted out, leaving only the component values of the target's magnetic field in the coordinate system defined by the orthogonal magnetic sensors. The component values can be resolved using conventional vector-analysis techniques to yield an indication of the direction to the target magnetic body.

Figure 5:
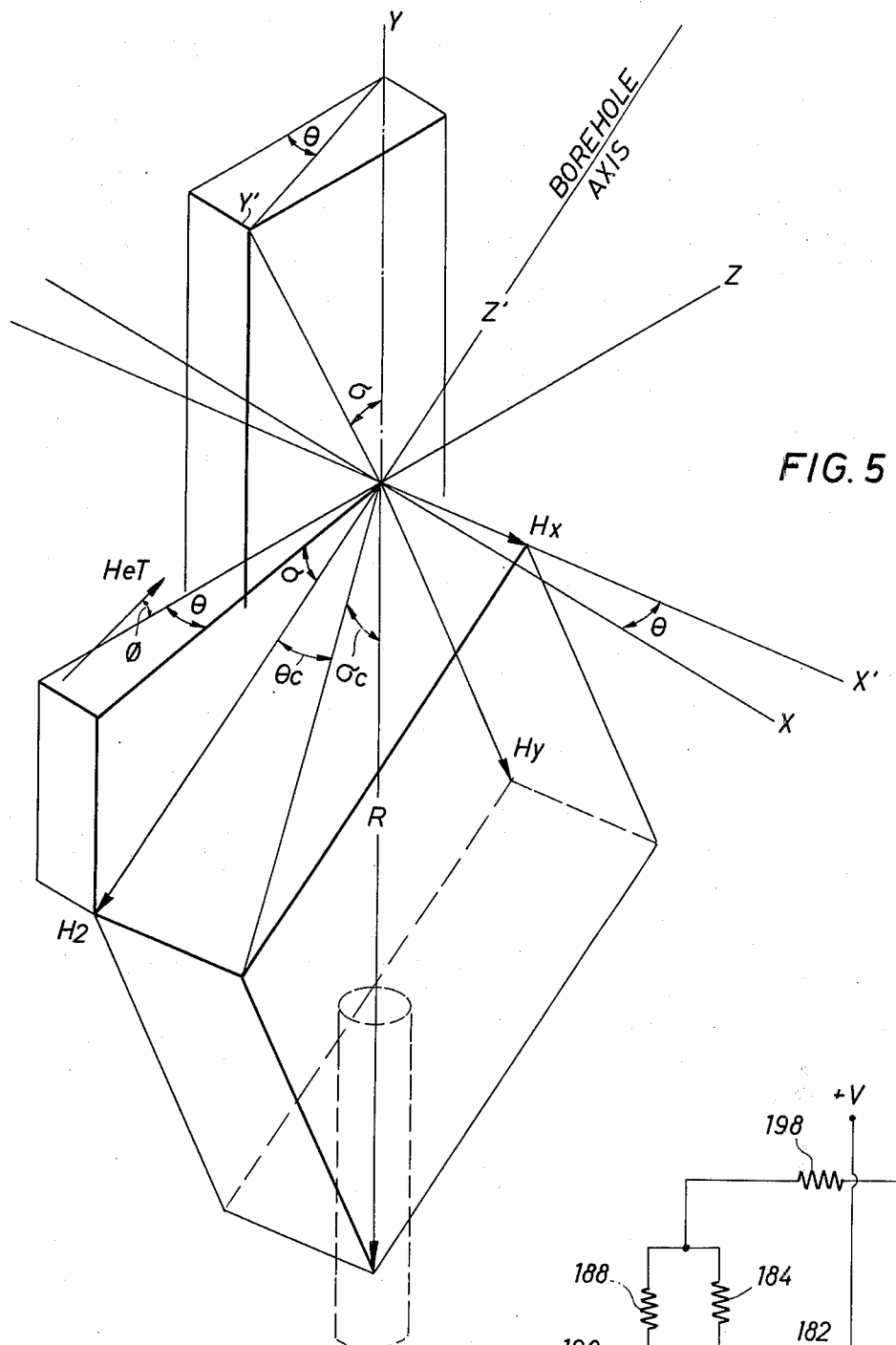
FIG. 5 is a diagram of the coordinate axis system defined by the set of orthogonal magnetic field sensors carried by the subsurface field sensing apparatus disposed in the open borehole.

Referring to FIG. 5, there is an illustrative diagram of a magnetic target and the coordinate system defined by magnetic sensing apparatus adequate to serve as an example to which the theory and approach to determining target direction can be applied. The coordinate axis system defined by the three orthogonal magnetic sensors has its three axes referenced as $X'$, $Y'$ and $Z'$. The horizontal $X'$ axis and the slanted off-vertical $Y'$ axis are perpendicular to the axis of the borehole which is the $Z'$ axis. Due to the slant $\sigma$ of the borehole, the coordinate axis system formed by the orthogonal magnetic sensors has rotated about the $X'$ axis; and while having a common origin, the magnetic sensor coordinate system and the surface coordinate system do not coincide.

The magnetic field sensors associated with the $X'$, $Y'$ and $Z'$ axes will measure the magnetic field intensity components of the total magnetic field (i.e. earth and target). The measured component magnetic field intensities of the target field will be referred to as $H_{x'}$, $H_{y'}$ and $H_{z'}$. The diagram of FIG. 5 will also serve as a vector diagram with the reference designations $H_{x'}$, $H_{y'}$ and $H_{z'}$ indicating relative magnetic field components attributable to the target magnetic body.

With the magnetic sensors still a significant distance from the target such that there is no contribution by the target's magnetic field to the measured component values, the earth's magnetic field components in the X', Y' Z' coordinate axis system can be determined. While the earth's field does have a gradient, it is so slight as to be regarded as insignificant and its intensity treated as a constant. As the field of the target becomes measurable with the advancement of the magnetic sensors down the offset borehole, the measured earth's field components can be subtracted from the total field components being detected by the sensors, thereby leaving only the components due to the target's field in the X', Y', Z' coordinate system.

Knowing the components of the target field, the location of the target with respect to the origin of the X', Y', Z' coordinate system can be determined.

A complete description of the components of the earth's magnetic field, $H_e$, in the axial and radial directions can be calculated for any depth location of the magnetic sensors in the subsurface borehole. In order to formulate this description, knowledge is required of the total field intensity, $H_T$, and the dip angle, $\phi$, of the earth's magnetic field at the specific location on the earth where the borehole is to be drilled. The total field intensity and dip angle can be obtained from the U.S. Navy Hydrographics Office.

It is also necessary to know the angle of inclination, $\sigma$, from horizontal and the direction, $\theta$, from magnetic north, at the various depths of interest, of the borehole. This information is obtained prior by taking magnetic field measurements with the subsurface magnetic sensing apparatus. Alternatively, a determination of borehole direction and deviation from vertical, referred to as inclination, at various depths is obtainable through a survey conducted by a photoclinometer or clinograph. Both instruments record a series of deviation measurements correlated with their depth on one trip into and out of the borehole. From either, it is possible to determine the course and direction of the borehole.

With the above information, the component values of the total field, $H_T$, is in the X', Y', Z' coordinate axis system can be expressed by the equations:

$$H_{x'} = H_T \cos \phi \sin \theta$$

$$H_{y'} = H_T [\sin \phi \sin \sigma + \cos \phi \cos \theta \cos \sigma]$$

$$H_{z'} = H_T [\sin \phi \cos \sigma - \cos \phi \cos \theta \sin \sigma].$$

The predicted values of the earth's magnetic field in the X, Y, Z coordinate system may be used to check out proper operation of the magnetic sensors. Also, deviations from the predicted values can be used to indicate the presence of a magnetic target.

To illustrate the above equations, assume that the earth's field, $H_e$, is 43,168 gammas and the dip angle is 37.6°. Further assume that the borehole direction is 33.5° and the borehole inclination is 38.9°. From the above equations, with $H_T = H_e$, the earth's field component measured by the X' axis magnetic sensor is 18,877 gammas. The component measured by the Y' axis sensor is 38,736 gammas, and the component along the Z' axis is 2575 gammas. To check the values, they may be resolved into a resultant according to the mathematic expression — $\sqrt{H_x^2 + H_y^2 + H_z^2} = H_T$. Substituting the above values yields the earth's field of 43,168 gammas, as it should.

Continuing with reference to the diagram of FIG. 5, from the magnetic field intensity components $H_{x'}$, $H_{y'}$ and $H_{z'}$ measured by the orthogonal magnetic sensors, the azimuth correction angle $\theta_c$ and the elevation angle $\sigma_c$ can be determined. Assuming no rotation of the coordinate axis system about the Z' axis, the azimuth correction angle $\theta_c$ can be determined as:

$$\tan \theta_c = \frac{H_{x'}}{H_{z'}}$$

$$\theta_c = \tan^{-1} \frac{H_{x'}}{H_{z'}}$$

The elevation correction angle $\sigma_c$ can be determined as:

$$\tan \sigma_c = \frac{H_{y'}}{H_{x'}^2 + H_{z'}^2}$$

$$\sigma_c \tan^{-1} \frac{H_{y'}}{H_{x'}^2 + H_{z'}^2}$$

If rotation of the X', Y' Z' coordinate axis system occurs, there will be no change in $H_{z'}$; however, the values of $H_{x'}$ and $H_{y'}$ will be affected. The vector diagram of FIG. 5 illustrates the following calculations which provide corrected values for the component values, $H_{x'}$ and $H_{y'}$. The corrected values used in the above equations for the azimuth correction angle $\theta_c$ and the elevation correction value $\sigma_c$. In the diagram and calculations, $\psi$ represents the angle of rotation of the coordinate axis system. From the diagram and beginning with the expression $$H_y = \frac{H_{y'}}{\cos \psi} + H_x \tan \psi,$$

which can be rewritten as $$H_y = \frac{H_{y'}}{\cos \psi} + H_x \frac{\sin \psi}{\cos \psi}$$

and simplified to $$H_y \cos \psi = H_{y'} + H_x \sin \psi,$$

from which can be shown that the corrected value is $$H_y = H_y \cos \psi - H_x \sin \psi.$$

Further, it can be readily appreciated that $$H_{x'} = H_y \sin \psi + H_x \cos \psi.$$

The resultant, R, in the vector diagram of FIG. 5 should not be confused with the range, r, determined in accordance with the ranging technique previously described. The resultant, R, relates only to the directionality of the detected magnetic target, and its magnitude is merely indicative of the total target field strength. The value of the field can be calculated according to:

$$H \text{ target} = \sqrt{H_{x'} + H_{y'} + H_{z'}}.$$

The foregoing discussion of target direction determination has been with respect to the detection of static magnetic fields; however, an alternate approach may be used if a time varying magnetic field can be set up about the target. In order to set up a time varying magnetic field, a well casing or the like is excited with an a.c. current. The field resulting from this type of excitation will, if diagramed appear as a series of concentric rings emanating from the target source. The circular flux lines of the field will be directed in accordance with the familiar "right-hand rule". The intensity of field produced will fall-off at a rate inversely proportional to the distance from the target source, i.e. $H = KI/r$.

An a.c. magnetic field sensor having a sensitivity response that is a maximum along one axis, when aligned with the field, and a null along another axis perpendicular to the maximum sensitivity axis, when aligned with the field, is suitable to detect the time varying magnetic field and be used to indicate direction to the target. Placed in the time varying field described above, a maximum signal would be detected with the first axis defined above oriented tangentially to the circular flux lines, and a minimum would be detected with the sensor oriented with the null axis tangential to the circular flux lines.

Therefore, with the a.c. magnetic sensor in the time-varying magnetic field set up around the target casing, direction to the target can be determined by changing the orientation of the sensor until a null response is obtained. Knowing that a null response will occur only when the maximum sensitivity axis is perpendicular to the circular flux lines emanating from the target sources, the direction to the target will be that direction in which the maximum sensitivity axis is pointing.

The time-varying (quasi-static) magnetic fields produced by alternating electric currents injected into the target well casing can be utilized in the same manner as described above and will have additional advantages of synchronous detection and the elimination of the effects of the Earth's magnetic field, thereby increasing the precision of the survey.

B. SURVEY SYSTEM APPARATUS

A survey system in accordance with the present invention for implementing the above theory and techniques of locating from an off-vertical borehole a predetermined subterranean target includes both surface and subsurface instruments.

The subsurface instrument is basically a magnetic field sensing apparatus having magnetic sensors and associated operating circuitry which provide a highly sensitive magnetometer capable of detecting minute magnetic fields. In addition, the magnetic sensor arrangement permits the measurement of three magnetic field components to allow calculation of the magnitude of the detected magnetic field and the direction to the target magnetic source from which the field emanates. The particular magnetic sensor arrangement in the subsurface instrument also provides an apparatus that is suitable for carrying out the "ranging" technique described previously herein, whereby the distance to the predetermined magnetic target from the magnetic field sensing apparatus is determined.

The surface instrument basically comprises the data processing equipment necessary for manipulating the data obtained by the subsurface magnetic field sensing apparatus. A programable calculator is provided in which the conditioned data is stored and subsequently processed. Processing of the data is in accordance with predetermined programs that manipulate the data to calculate range and direction to the predetermined subsurface target. Peripheral equipment is also provided for data storage and printout of the processed information.

The programs utilized to process the magnetic field intensity information being supplied from the subsurface instrument primarily carry out the calculations for target range and target direction determination. However, additional programs can be provided to apply correction factors to the data being obtained to provide greater accuracy. Though optional, the surface instrument may further comprise a strip chart recorder and various meters for displaying the data obtained from the subsurface instrument.

1. Subsurface Field Sensing Apparatus a. General

The subsurface instrument is designed to detect both quasistatic and time-varying fields. To provide such capability, the instrument includes multiple sensors to provide a D.C. magnetic field sensing system and an A.C. field sensing system. When static magnetic fields are to be detected, referred to as the passive mode of operation, the instrument's D.C. magnetic field sensing system is utilized. However, when operating in the active mode, as when time-varying fields are to be detected, the A.C. field sensing system of the instrument can be used.

Basically, the D.C. magnetic field sensing system comprises a set of three mutually perpendicular D.C. magnetic field sensors defining an X-Y-Z coordinate system. The X-axis magnetic sensor and the Y-axis magnetic sensor each comprise a single magnetometer; the Z-axis magnetic sensor comprises two D.C. magnetometers that are spaced apart a predetermined distance. The orthogonal set of D.C. magnetometers are used to determine the direction of the subsurface target from the subsurface instrument by measuring three magnetic field intensity components of the magnetic field emanating from the subsurface target. The magnetic field intensity components are those that are measured along the X, Y and Z axes of the coordinate system defined by the orthogonal set of magnetic sensors. With this arrangement of magnetic sensors, the surface data processing instrument can calculate the direction of the detected subsurface target by resolving the magnetic field components into a resultant vector. The primary use of the two separated magnetometers that are aligned along the Z-axis is to carry out the "ranging" technique previously described herein to determine the distance from the subsurface instrument to the detected subsurface magnetic target.

The A.C. field sensing system actually comprises two types of sensors. One sensor is an A.C. magnetic field sensor, and the other sensor is an electric field sensor. In order to use the A.C. field sensing system, a time-varying field, either magnetic or electric, must be set up aroung the target well. Typically, a high current cathodic protection type power supply attached to the well casing being used as a target is suitable. The power return may be made through any other grounding connection, such as a second well casing located some distance from the target casing.

Excitation of the target casing by current flowing along the casing produces a circular magnetic field around the axis of the target well casing. The A.C. magnetic field sensor can be used to detect the A.C. component of this field and determine directionality to the target. If it proves to be difficult to establish adequate current flow through the target casing to produce a satisfactory magnetic field, as when excessive current leakage to ground exists, the electric field probes may be utilized to detect the electric field gradient set up by the A.C. component of the excitation current.

b. Mechanical Configuration

Figure 7A:
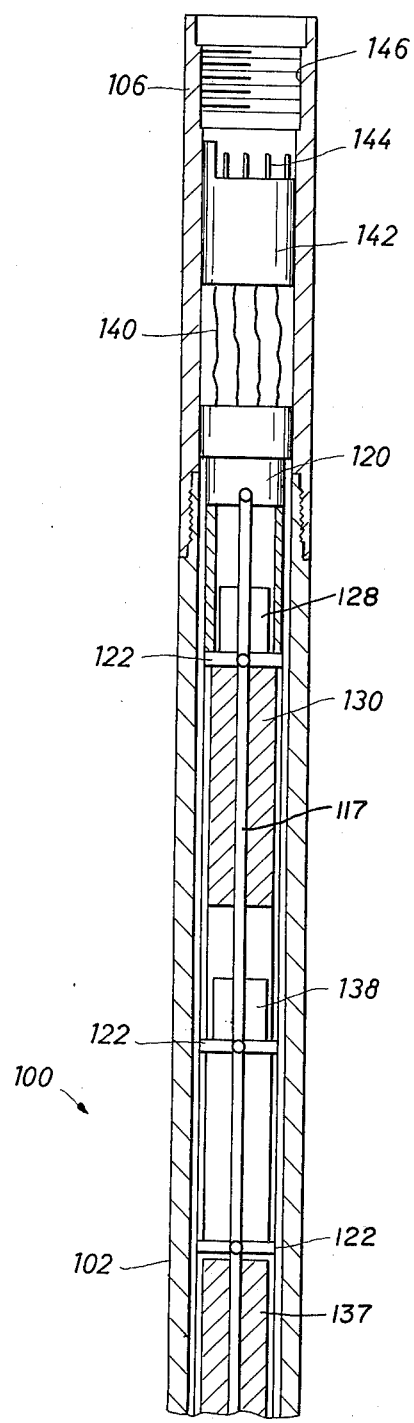
FIG. 7 is a cross-sectional view of the subsurface field sensing apparatus.
Figure 7B:
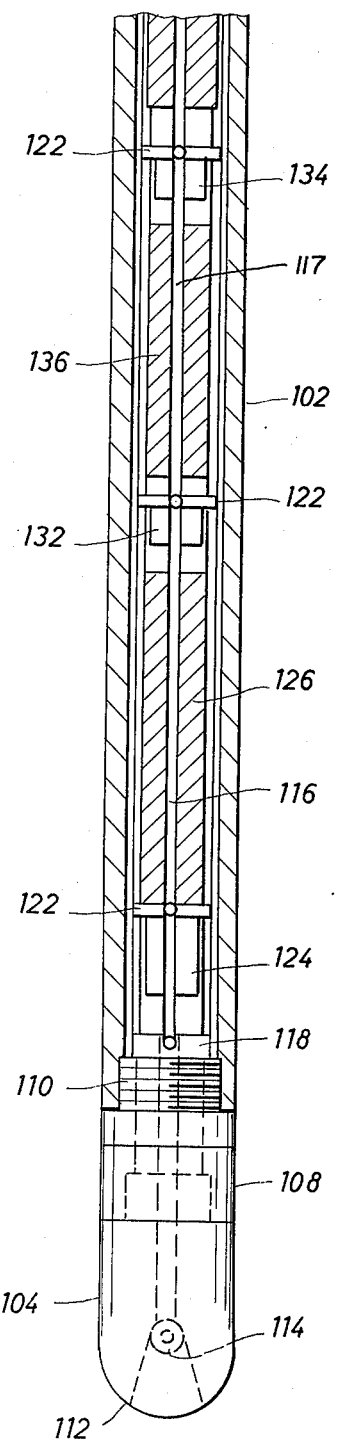

Referring now to FIGS. 7A and 7B, there is shown a cross-sectional view of one embodiment of a subsurface field sensing apparatus, referred to as apparatus 100, having a generally cylindrical and elongate configuration. The body portion of the apparatus comprises a tubular outer housing 102 of non-magnetic material, preferably stainless steel, have a nose cone 104 at the anterior and a connector housing 106 at the posterior. Nose cone 104 includes an adapter 108 having threads 110 thereon which provide a means of attaching nose cone 104 to housing 102. Enclosed within the fiberglass nonconductive nose cone 104 are electric field probes 112 and an A.C. magnetic field pickup coil 114. Both the coil 114 for the A.C. magnetic field sensor and the electrodes for the A.C. potential detector are potted into nose cone 104. Wiring from coil 114 and electrodes 112 is also potted up through the nose cone 104 and connected to a terminal strip (not shown) at the rear of the nose cone.

Enclosed within the outer housing 102 are the electronics for subsurface apparatus 100. The various printed circuit boards containing the electronics for the various field sensing devices are carried on a frame 116 comprised of four elongate stringers 117 that extend substantially the entire length of the outer housing 102. The frame 116 further comprises a front bulkhead 118 and a connector bulkhead 120 between which the stringers are secured. A series of separating bulkheads, all referenced by the numeral 122, provide support to the stringers intermediate their ends.

The arrangement of the electronics within outer housing 102 has a Z-axis sensor 124, referred to as the $Z_1$ axis sensor, and its corresponding printed circuit board 126 disposed at the front of tool 100. A second Z-axis sensor 128, referred to as the $Z_2$-axis sensor, is disposed adjacent the connector bulkhead 120. A printed circuit board 130 disposed slightly ahead of the Z-axis sensor 128 carries the electronics for that sensor. The separation between the $Z_1$-axis sensor and the $Z_2$-axis sensor is a predetermined and accurately fixed distance which is preferably approximately three feet. The X-axis sensor 132 and the Y-axis sensor 134 are disposed at a position intermediate the ends of the apparatus 100. A printed circuit board 136 positioned between the X-axis sensor and the Y-axis sensor carries the electronics for both sensors. Disposed immediately behind the Y-axis sensor 134 is the power regulator circuit board 137. Slightly further back and adjacent to the $Z_2$-axis sensor electronics is the vertical reference sensor 138.

The mechanical positioning of the magnetic sensors is critical not only with respect to the outer housing 102 but also with respect to the other sensors. Proper arrangement of the sensors will have the axis of maximum sensitivity for the $Z_1$-axis sensor 124 and the axis of maximum sensitivity for the $Z_2$-axis sensor 128 aligned with the longitudinal centerline axis of the outer housing 102. The axes of maximum sensitivity of the X-axis sensor 134 and the Y-axis sensor 132 will both be perpendicular to the longitudinal center-line axis of the housing 102. In addition, the axis of maximum sensitivity of those two sensors must be perpendicular to one another. Therefore, close attention must be paid to the mechanical alignment of the magnetic sensors of the subsurface field sensing apparatus.

Electrical power being supplied to the apparatus 100 from the surface power supplies, as well as the output signals of the various sensors with the apparatus 100, are carried over interconnecting wires 140 connecting to a cable connector 142 having connector pins 144. The cable from which the apparatus 100 is suspended during the surveying operations attaches to connector housing 106 by the internal threads 146 formed on the inside of the connector housing. The wires that extend between the subsurface apparatus and the surface instruments that records the measured data connect to connector pins 144 through a mating femal connector (not shown).

c. Subsurface Electronics

Figure 8:
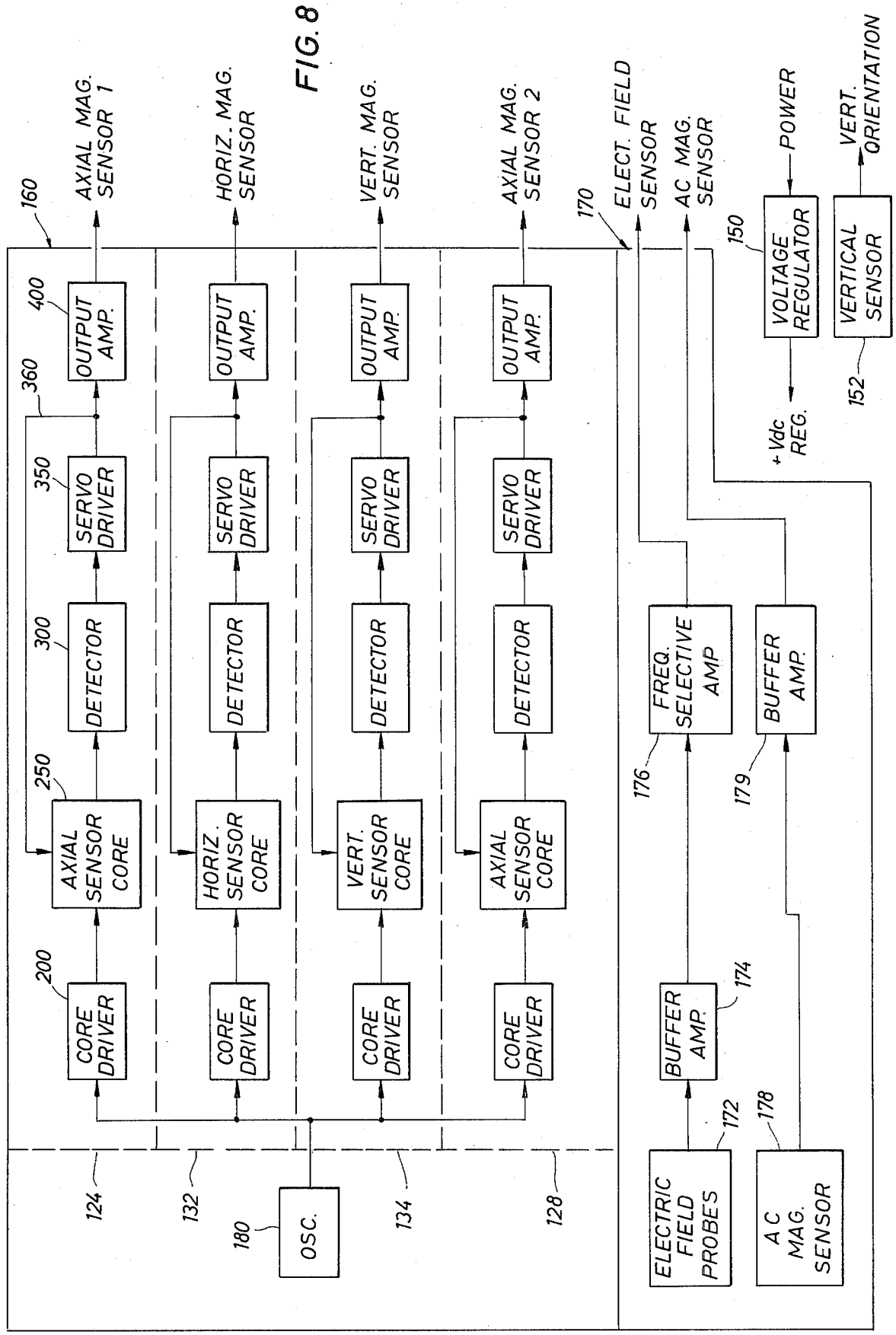
FIG. 8 is a block diagram of the subsurface electronics carried by the subsurface field sensing apparatus.

Referring next to FIG. 8, a block diagram of the electronics for the subsurface field sensing apparatus is presented. The electronics include the circuitry necessary for both the DC magnetic field sensing system, generally designated by the reference numeral 200, and also for the AC field sensing system, generally designated by the reference numeral 300. In addition, electronic circuitry is provided for maintaining proper power levels to the circuitry in both systems.

Referring first to the DC magnetic field sensing system 200, that system includes the four DC magnetometers 124, 132, 134 and 128 referred to previously in connection with FIG. 7. The magnetometers each produce an output signal that is proportional in amplitude and polarity to the magnitude and direction of the particular magnetic field intensity component that each is oriented to detect. The output signals from these magnetometers represent the X, Y and Z coordinate vectors from which may be resolved a resultant vector indicative of the total detected external magnetic field and the direction to the target magnetic source. In addition, the axial DC magnetic sensors 124 and 128 are used to make measurements of the Z axis component of the detected field at two separated locations along the borehole. From the measurements obtained, the target range can be calculated in accordance with the ranging technique described herein.

The DC magnetic field sensing system includes, in addition to the four DC magnetometers, an oscillator 180 which provides at its output an alternating excitation current of a predetermined frequency and magnitude. The oscillator output signal is introduced simultaneously to the core drivers of each DC magnetometer. The core driver amplifies the excitation current and supplies that amplified signal to a sensor core element which is driven into saturation by alternating the driving polarity at the frequency of the ascillator.

The sensor cores produce an output signal that is proprotional in amplitude and polarity to the magnitude and direction of the magnetic field intensity component along the particular coordinate axis that the core is oriented to detect. Output signals from the cores, having the form of alternating positive and negative pulses, represent the X, Y and Z component vectors of the detected magnetic field. Returning to the block diagram of FIG. 8, the sensor output signal is introduced into a detector which respectively rectifies positive and negative pulses, differentially, integrating each, then adding the two quasi-static voltages summed. The output signal from the detector is fed to a servo driver from which a feedback signal is introduced into the sensor core secondary winding to provide a means of magnetically nulling out signal level errors introduced through temperature drift and offset voltage in the various amplifiers and extraneous magnetic flux in the core. The servo driver output is also connected to an output amplifier which increases the power level of the signal for transmission of the signal over the lengthy cables extending to the surface instrument.

Referring next to the AC field sensing system 170, the same includes electric field probes 172 for detecting the presence of an electric field. The electric field probes 172 are connected to an amplifier 174 which amplifies the developed electrical signal and passes it on to a frequency selective amplifier 176. The frequency selective amplifier 176 removes all extraneous noise, leaving only the information carrying signal. The signal is then, of course, available as an output for transmission over its connecting cable to the surface instrument.

The second type of sensor in the AC field sensing system is the AC magnetic 178. This sensor is responsive to time varying magnetic fields set up around a target source and produces an output signal functionally related to the detected field. The output signal from the AC magnetic sensor 178 is received by an amplifier 179 for amplification and conditioning prior to transmission to the surface instrument.

Prior to proceeding with a discussion of the circuitry of each DC magnetometer, special attention should be devoted to the magnetic sensor cores. Of particular interest is the magnetic sensor response pattern that is diagrammed in FIG. 9. The response pattern can best be described as being shaped like two spheres joined together. An axis of rotation, M, can be defined by a line segment passing through the point of contact of the spheres, $S_1$ and $S_2$, and also passing through the centers of both. Perpendicular to M and tangent to $S_1$ and $S_2$ at the point of contact is the null plane P. A second axis, referred to as a null axis N, may be defined that is perpendicular to and intersecting with the axis of rotation, M, which null axis lies in the null plane.

The output response of the magnetic sensor provides an output signal that in general substantially follows a cosine wave as the sensor core is rotated about the null axis N. Specifically, the magnetic sensor will produce maximum voltage output when the axis of rotation, M, which may also be termed the axis of maximum sensitivity, is aligned with the magnetic field. This may be more readily understood with reference to FIG. 9. Restated, the sensor output will be at maximum when the magnetic field being detected is directed as is $H_1$, that is $\omega = 0°$.

If the sensor is caused to rotate about the axis, M, the axis of maximum sensitivity, there will be no change in the sensor output. When the sensor is placed in a magnetic field that is directed at an angle oblique to the axis of maximum sensitivity, as is the field $H_2$, the sensor output will decrease as a function of cosine $\omega$. Rotation of the sensor about an axis in the null plane with the magnetic field $H_2$ at a angle $\omega$ with respect that that axis will again not produce a change in the sensor output. If the angle $\omega$ is increased such that the magnetic field is directed normal to the axis of the maximum sensitivity, i.e. $\omega = 90°$, the sensor output will be zero. If the angle $\omega$ exceeds 90° such that the sensor is placed in a field directed as $H_4$, the sensor output will change from positive to negative, passing through zero.

Figure 10:
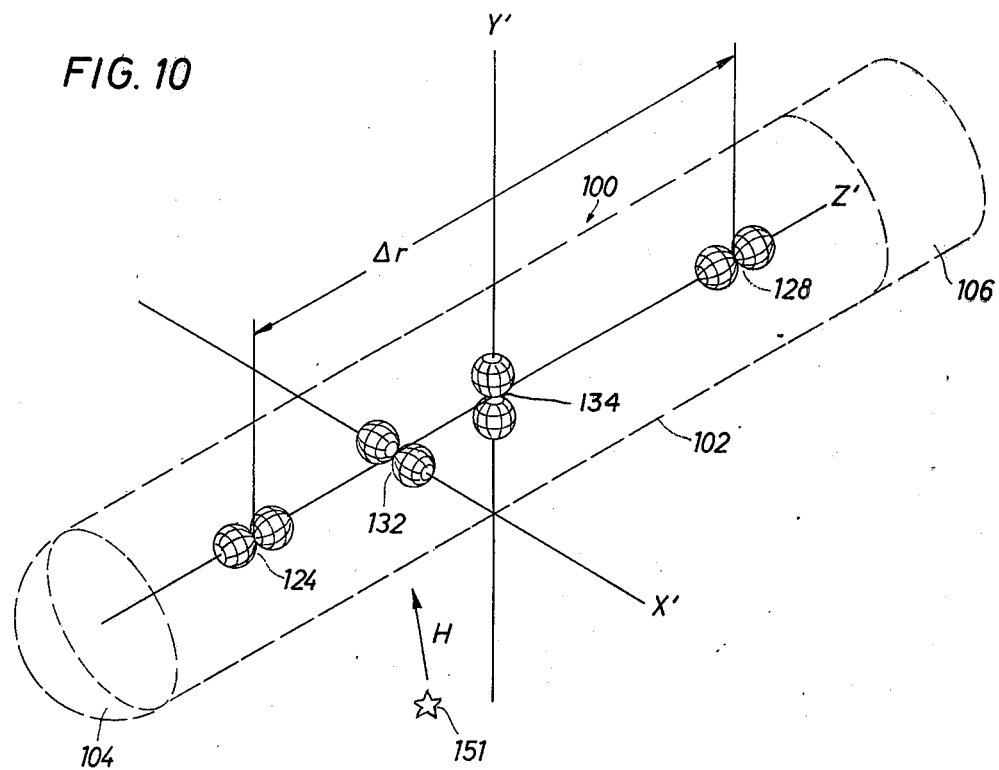
FIG. 10 is a diagram of the arrangement of the magnetic sensors within the subsurface magnetic field sensing apparatus, as depicted by the response patterns of the sensors.

In FIG. 10, there is presented a diagram of the subsurface apparatus 100 in which the DC magnetic sensors 124, 128, 132 and 134 are represented at their respective locations by their characteristic magnetic field sensitivity response pattern. As discussed previously, the magnetic sensors define a three-axis coordinate system, wherein the axes are designated X' (horizontal), Y' (vertical) and Z' (axial). Theoretically, the magnetic sensors should define coordinate axes that pass through a common origin; however, as a practical matter, this is not possible. But, it is to be appreciated that it is desirable to place X'-axis sensor 132 and Y'-axis sensor 134 as close to one another as is physically possible to approximate a common origin. The Z'-axis sensors 124 and 128 are, of course, separated by a defined distance $\Delta r$ in order to carry out the ranging technique.

To be noted in the diagram of FIG. 10 is the fact that the axes of the coordinate axis system are defined by the axes of maximum sensitivity of the magnetic sensors. The axis of maximum sensitivity of both axial sensors 124 and 128 are aligned with the centerline of the apparatus 100. The centerline axis of the apparatus, of course, corresponds to the Z-axis of the coordinate system. The horizontal and vertical axes are defined by the axes of maximum sensitivity of the sensors 132 and 134.

Figure 9:
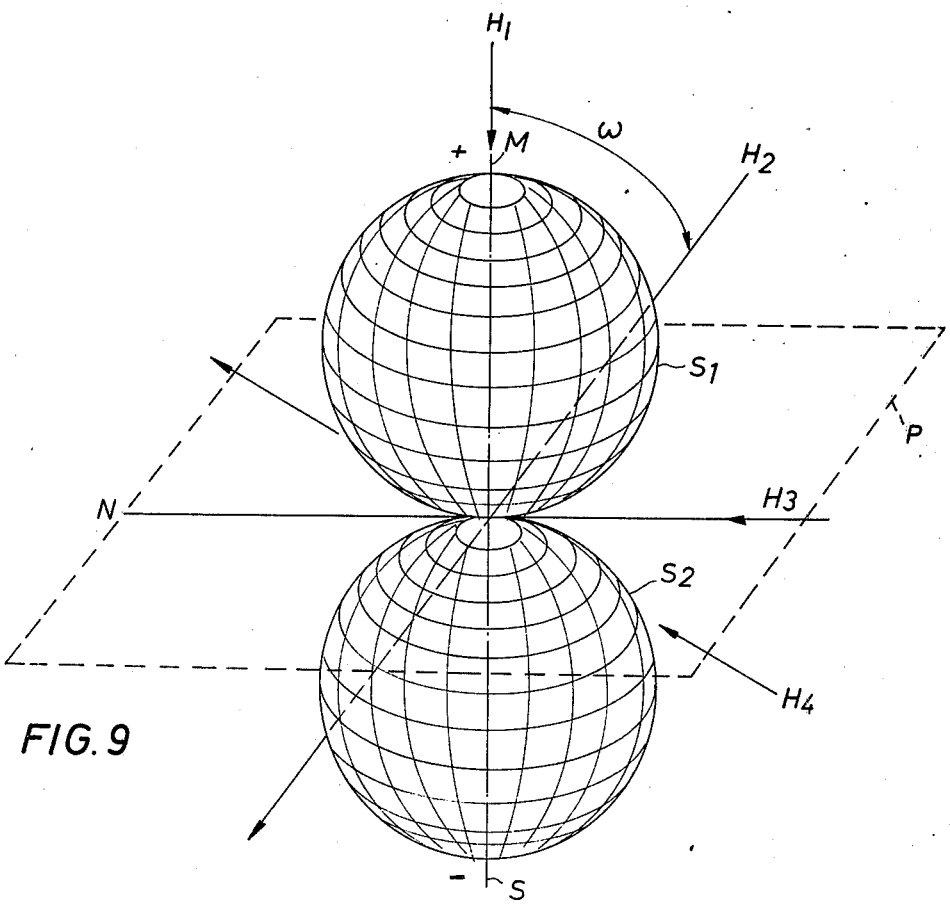
FIG. 9 is a diagram of the visualization of the response pattern of the magnetic sensor elements used in the present invention.

From the diagram of FIG. 10 and the discussion given above relating to the response pattern illustrated in FIG. 9, it will be apparent that the magnetic field emanating from a subsurface magnetic target source 151 will usually impinge each sensor core at a different angle $\omega$ because of the varying orientation of each sensor. This will cause a different output signal to be produced by each sensor. The output signal produced will be in accordance with the formula:

$$V_o = (K)(H) \cos \omega,$$

where
  $V_o =$ the sensor output;
  $H =$ the total magnetic field intensity;
  $K =$ a factor in volts/gamma expressing the voltage produced for a given field intensity; and
  $\omega =$ the angle at which the magnetic flux lines impinge the sensor core.

It will further be apparent that, as the apparatus 100 is changed in orientation with respect to a magnetic field $H_4$, the output of the sensors will change in accordance with the above function. For example, as apparatus 100 rotates about the Y' axis, the axis of maximum sensitivity of the axial sensor 124 will become more nearly aligned with the field, resulting in an increased output signal from the sensor. However, as rotation occurs as described, the X-axis sensor 132 will also be changing in orientation with the axis of maximum sensitivity therefor being turned away from the field. A change of orientation of the X-axis sensor in this manner will result in a decreasing output signal. It will be appreciated that rotation about the Y'-axis as described will have no effect upon the output of the Y'-axis sensor 134. The amplitude of the output signal therefrom will remain constant, as no change in the orientation of its axis of maximum sensitivity with respect to the field occurs. A change in the output of Y-axis sensor 134 will, of course, be produced by rotation of apparatus 100 about the X'-axis.

In addition to the conductors for the output signals from the DC magnetometers of the DC field sensing system and the output signal from the AC field sensing system sensors, conductors must be provided for voltage regulator 150 which regulates the DC power provided by surface power supplies. Further included in the subsurface electronics is a vertical sensor 152 that provides information concerning the vertical orientation of the subsurface apparatus 100.

Specifically, the vertical sensor provides the angular relationship between the sensor reference plane that contains the axis M and the X-axis sensor and vertical. Normal rotation in the borehole about the Z axis will move the X and Y axes through random orientations and will provide instantaneous vertical and horizontal vector components of the detected field when their angular relationships with the vertical and horizontal planes are known.

Figure 11:
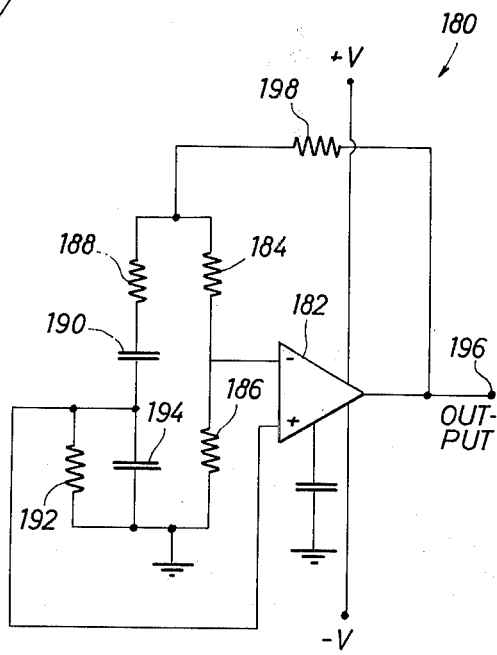
FIG. 11 is a schematic diagram of a suitable oscillator circuit for use in the subsurface electronics block diagramed in FIG. 8.

Referring next to FIG. 11, an oscillator circuit system 180 is presented. The oscillator circuit shown is commonly referred to as a Wien-bridge oscillator. The oscillator comprises an active element, operational amplifier 182, having a positive feedback network connecting to the non-inverting input and a negative feedback loop connecting to the inverting input. The negative feedback loop controls the gain of the amplifier and comprises resistors 184 and 186. The inverting input of operational amplifier 182 connects to the negative feedback loop at the junction of the resistors. The positive feedback network forms the second leg of the bridge and comprises two R-C networks. The first R-C network is comprised of resistor 188 and capacitor 190, which are arranged in series. The second R-C network is a parallel combination of resistor 192 and capacitor 194. The non-inverting input of operational amplifier 182 connects to the junction of the two R-C networks. As shown, both the positive feedback network and the negative feedback loop are grounded on one side and are connected to the output lead 196 of the operational amplifier through a feedback resistor 198.

The oscillator circuit 180 provides an amplitude-stabilized sine wave oscillator yielding a high purity sine wave output. Primarily, frequency stability depends upon the temperature stability of the components being used in the positive and negative feedback loops. In this particular application, the oscillator is preferably set up to provide a frequency of three kilohertz. Values for the components to provide this frequency are given in the Parts List at the end of the description of the electronics. To select a different frequency, reference may be had to the expression for frequency determination provided in the Linear Applications Handbook available from National Semiconductor at page AN 51-8.

Figure 12:
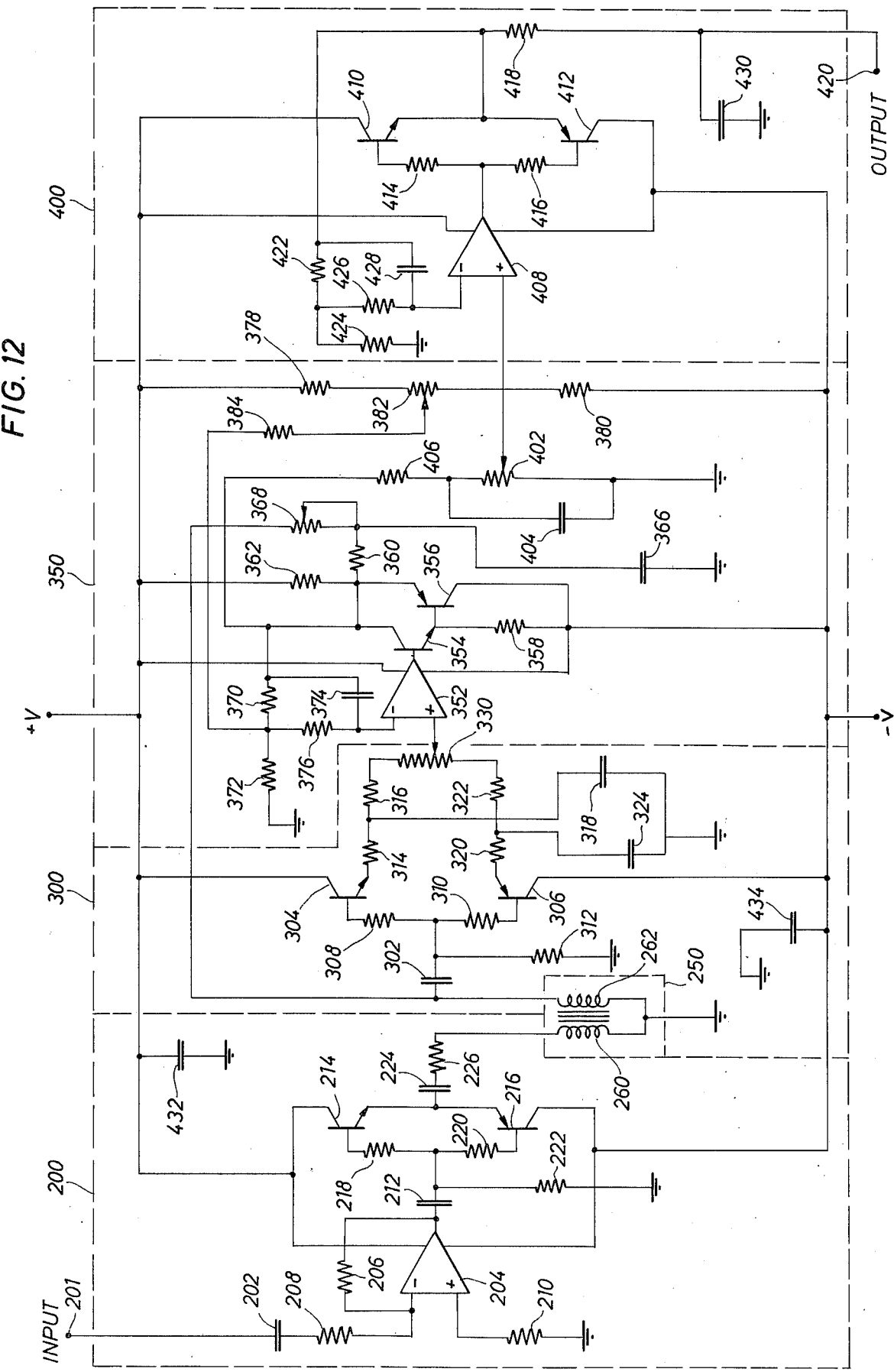
FIG. 12 is a schematic diagram of the circuitry for one of the identical magnetic field sensors.

Referring next to the circuit of FIG. 12, there is presented a schematic diagram for a DC magnetometer that is suitable for use in the DC magnetic field sensing system. The circuitry shown therein is representative of that which is used for each magnetic sensor 124, 132, 134, 128. As mentioned previously, the output of oscillator circuit 180 is applied to a core driver 200 which comprises a waveform shaping circuit and a push-pull emitter follower current amplifier. The oscillator output signal is applied to the core driver at terminal 201 and is passed to the waveform shaping circuitry by an ac coupling capacitor 202. The waveform shaping circuit has a gain that is slightly greater than one, preferably on the order of about 1.5. Since the amplitude of the oscillator output signal is at or very near the power supply limits, the gain provided in the waveform shaping circuit causes the sine wave from the oscillator to be clipped. After clipping, the waveform approximates a trapezoidal waveform.

The waveform shaping circuit is basically an inverting amplifier configuration utilizing an operational amplifier 204 and having a feedback loop consisting of resistor 206 that connects between the output and the inverting input of operational amplifier 204. An input resistor 208 constitutes the input network and connects between the inverting input of operational amplifier 204 and coupling capacitor 202. The non-inverting input of amplifier 204 is connected to ground through a biasing resistor 210.

The push-pull emitter follower circuit is coupled to the waveform shaping circuit by a capacitor 212, and comprises an NPN transistor 214 and a PNP transistor 216 arranged in a conventional manner. The base of each transistor is connected to the coupling capacitor through a resistor 218 or 220, respectively. A resistor 222 connects between coupling capacitor 212 and ground.

As will be readily appreciated, transistor 214 amplifies the positive portion of the near trapezoidal waveform from amplifier 204, and transistor 216 amplifies the negative portion of that waveform. The emitters of both transistor 214 and 216 are connected to a coupling capacitor 224 in series with resistor 226. Capacitor 224 couples the primary winding of sensor core 250 to the push-pull current amplifier of core driver 200.

Referring briefly to FIG. 13, a brief discussion of the sensor core 250 will be given to permit a more detailed understanding of the core, and also to provide adequate background for understanding the remaining portion of the DC magnetometer circuitry presented in FIG. 12.

The sensor core 250 is comprised of a toroid 254 and a bobbin 256 adapted to receive the toroid into a slot 258 formed in the bobbin. Toroid 254 is a tape wound core of 1 mil thick Supermalloy material, having a cross section measuring approximately $\frac{1}{8} \times \frac{1}{8}$ inch. A winding 260 is placed on the toroid and used as the primary winding shown schematically in FIG. 12. Winding 260 preferably has approximately 150 turns of No. 32 wire.

The toroid bobbin 256, as shown in an I-shaped block of material having slot 258 formed vertically through the structure. A winding 262 is placed on the web portion of the structure, which winding constitutes the secondary winding represented schematically in FIG. 12. Preferably, winding 262 comprises 600 turns of No. 32 wire.

The diagram in FIG. 14 is a side view of sensor core 250 with toroid 254 inserted within the bobbin 256. The centerline axis, M, through the center of toroid 254 is the axis of maximum sensitivity, M. Also in dotted outline are two spheres, $S_1$ and $S_2$, which are used, as previously, to represent the response pattern of the magnetic sensors. FIG. 14 relates the physical configuration of the sensor core 250 to the response pattern diagram of FIG. 9.

Current injected into the primary winding 260 on toroid 254 produces a magnetic flux, whose direction is given by the familiar right-hand rule. Taking the toroid 254 in FIG. 13 and the clockwise winding of primary winding 260 thereon, flux is produced in the directions as indicated in FIG. 14. As shown, the flux in the left side of the core is directed upwardly, while the flux in the right side is directed oppositely to it. Core driver 200 supplies sufficient current to rapidly saturate the toroid core, causing the rate of change of magnetic flux in the core to approach zero. The secondary winding 262 is linked by the magnetic flux produced by the current in the primary coil. A change of this flux with time will induce a voltage in the secondary winding 262.

Referring briefly to FIG. 15, the waveform of the output voltage available from the secondary winding 262 at terminal 252 is illustrated. The output voltage is observed to be a series of alternatively positive and negative-going spikes. During most of the period of each cycle of the driving signal, the net flux linking secondary winding 262 and the net rate of change of flux are zero because of the continuity of the toroid core that provides the magnetic path for the flux. During the instant that the left side and the right side are entering the region of saturation, however, spike is induced in the secondary winding due to the fact that both halves are not saturated at precisely the same time. When no external field component along the sensor axis (M) is present, the positive and negative spikes are equal in amplitude, as shown in FIG. 15a. When there is a component of external magnetic field along the sensor axis, the waveform appears as shown in FIG. 15b, wherein the positive spikes are greater in amplitude than the negative spikes. Circuitry is provided in the detector and servodriver portion to compensate and balance the amplitudes of the pulses. That circuitry will be discussed when attention is again directed to FIG. 12.

With reference to the illustration of FIG. 14, wherein an external magnetic field H is aligned with the axis of bobbin 256, the magnetic flux in the right side of bobbin 256 will be greater than that in the other side. Assuming that the flux in the right side is in the direction to produce a positive spike, the waveform of the output voltage will appear as the waveform illustrated in FIG. 15B. It will be appreciated that as the magnetic sensor core 250 changes in orientation with respect to an external magnetic field, such as that illustrated in FIG. 14, the component of the magnetic field aligned with the axis of maximum sensitivity will vary according to the cosine of the angle between the flux and the bobbin axis. This relationship was explained in detail in relation to the sensor response pattern of FIG. 9 in the discussion relating thereto.

Returning now to FIG. 12, the output signal from the sensor core 250 is applied to detector 300 through a coupling capacitor 302. Detector 300 comprises transistors 304 and 306 arranged in a push-pull configuration. Transistors 304, 306 have resistors 308 and 310, respectively, connected to their base leads, which resistors are in turn connected to coupling capacitor 302. A resistor 312 connects from the junction of the base resistors and the coupling capacitor 302 to ground. Transistor 304 detects the positive-going spike of the output voltage, and transistor 306 detects the negative-going spike in the sensor output voltagewaveform.

The positive spike from transistor 304 is applied to a balancing potentiometer 330 through a resistor and capacitor combination comprising resistor 314, resistor 316 and capacitor 318. This combination of components forms an integrator circuit and acts somewhat in the fashion of a peak-reading sample and hold circuit for the positive-going spike. In a similar fashion, the negative-going spike from transistor 306 is applied through a resistor and capacitor network comprised of resistor 320, resistor 322 and capacitor 324. The network also, in a manner of speaking, acts as a sample and hold circuit for the negative-going portion of the sensor output waveform.

As mentioned above, both the positive and negative portions of the sensor output voltage are applied to a potentiometer 330. Specifically, the two portions of the waveform are applied to opposite ends of the potentiometer with the wiper thereof being connected to the servo-driver 350. Potentiometer 330 through servo-driver 350 and the feedback line 360 associated therewith serves to drive current through the secondary winding 362 producing a magnetic feedback to balance out any imbalance between the amplitudes of the positive and negative spikes. Basically, the balancing is accomplished by adjusting the potentiometer 330 such that sufficient voltage is dropped across it on each side of the wiper to bring the amplitudes of the positive and negative spikes to the same level, reducing the error signal to zero. Should additional imbalance begin to occur, as by external magnetic field, the shift of relative spike amplitudes will result in a change in output signal amplitude and be fed back as a current to the output of the secondary winding of core 250 to create a field to compensate for the offset. Because the feedback arrangement maintains the operating point on the B-H loop of the magnetic core at the center of magnetizing force, and because the core is driven into saturation in both polarities, any change in permeability of the core due to temperature is balanced out exactly.

Servo-driver 350 is basically an amplifier circuit comprising an operational amplifier 352 driving a Darlington amplifier comprised of transistors 354 and 356 along with resistors 358 and 362. The Darlington amplifier provides significant current gain and input resistance with little increase in circuit complexity. The feedback path line 360 connects to the junction formed by the collector of transistor 354 and the emitter of transistor 356. Feedback line 360 includes a resistor 364 along with variable resistor 368. A filter capacitor 366 connects between the junction of resistors 364 and 368 to ground. The feedback line 360 extends between variable resistor 368 and terminal 252 of core secondary winding 262.

The gain for operational amplifier 352 is determined by the network connected between the servo-driver ouput lead at the collector of transistor 354 and the inverting input of operational amplifiers 352. Specifically, the gain is determined by resistors 370 and 372 with capacitor 374 being used to remove high frequency spikes, preventing their amplification and subsequent introduction into the feedback loop. Resistor 376 connecting between the inverting input of operational amplifier 352 and the junction of resistors 370 and 372 serves to match the input impedance between the inverting and non-inverting inputs of the operational amplifier 352. In order to provide an adjustment to offset in the servo-driver, the resistance network comprising resistors 378, 380 and potentiometer 382 is provided. The wiper of potentiometer 382 is connected through resistor 382 to the junction of resistors 370 and 372 to set a bias level at that point.

The output of the servo-driver is taken from the collector and emitter of the Darlington amplifier transistors and introduced into the output amplifier 400 through gain potentiometer 402 having a filter capacitor 404 arranged in parallel with it. In addition, a resistor 406 is placed in the circuit path ahead of potentiometer 402. Gain potentiometer 402 serves to adjust the level of the signal being introduced into the output amplifier. The gain adjustment potentiometer is preferably set to a point such that the output stage will operate without saturation when the magnetic sensor core is placed in an external magnetic field having an intensity as much as twice that of the earth's field. In addition to the gain potentiometer, the output amplifier 400 includes an operational amplifier 408 driving a push-pull emitter follower circuit, which circuit comprises transistors 410 and 412.

Resistors 414 and 416, respectively, connect to the base lead of transistors 410 and 412. The emitter follower circuit supplies the output signal through a resistor 418 to an output terminal 420. In addition, the feedback loop for the output amplifier 400 extends between the junction of the emitter leads of the transistors and the inverting input of 408. The network in the feedback loop comprises gain determining resistors 422 and 424 along with a filter capacitor 428 and impedance matching resistor 426. The output signal available from output amplifier 400 is of sufficient power level to transmit the signal over the cable that connects to the surface instrument.

Figure 16:
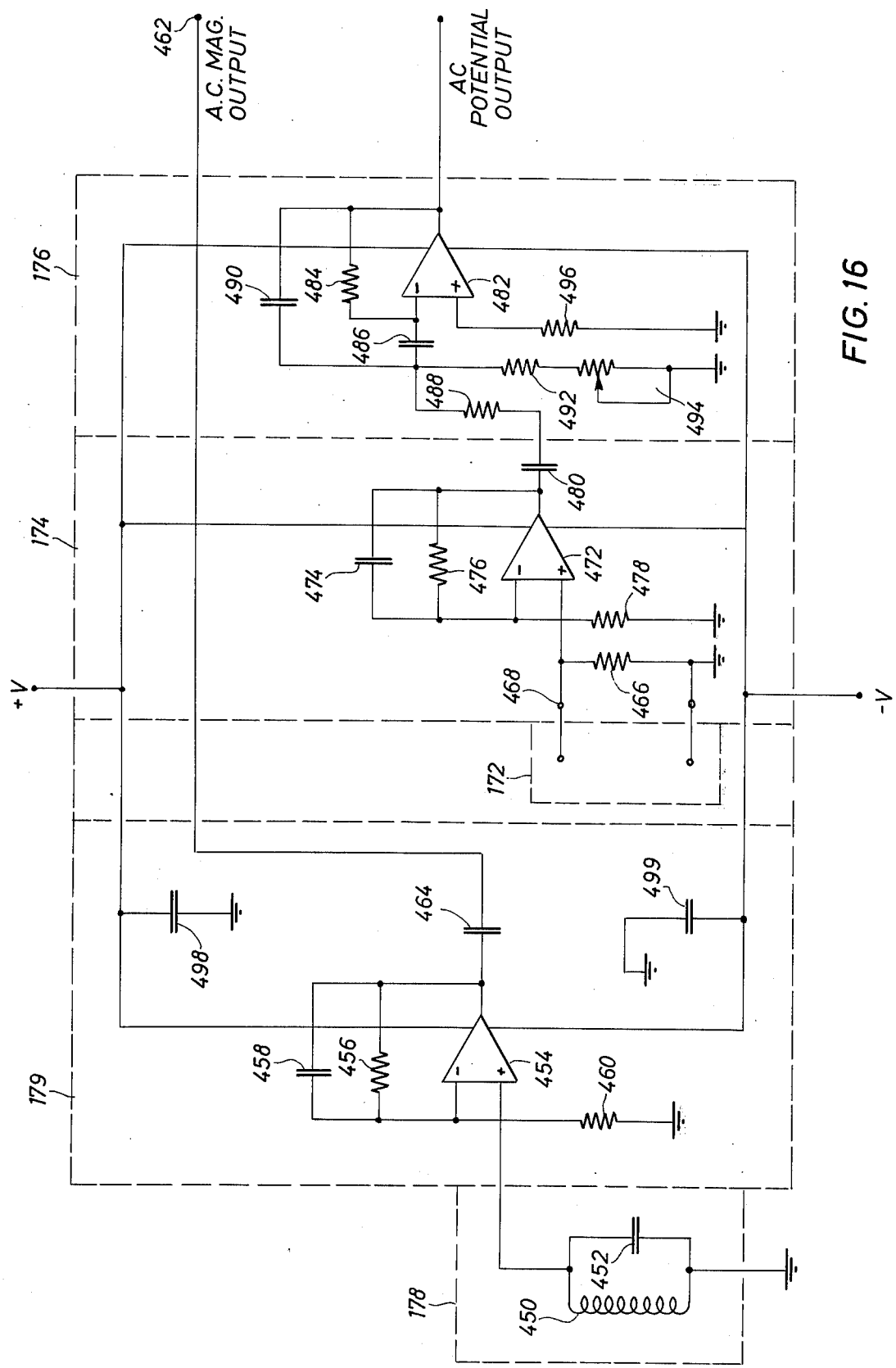
FIG. 16 is a schematic diagram of the electronic circuitry for the time-varying magnetic and electric field sensors in the subsurface field sensing apparatus of FIG. 7.

The schematic diagrams for both the AC magnetic sensor circuitry and the electric field probe circuitry are presented in FIG. 16. As shown, the AC magnetic sensor comprises a coil 450 in parallel with a tuning capacitor 452. The capacitor is used to tune the coil to the frequency of the time-varying magnetic field that is to be detected. The output of the magnetic sensor 178 is introduced to buffer amplifier 179 which is of a conventional configuration. Buffer amplifier 179 comprises an operational amplifier 454 having its non-inverting input connected to the AC magnetic sensor 178. A feedback loop extends between the output of the operational amplifier 454 and its inverting input, which feedback network comprises a parallel combination of resistor 456 and capacitor 458. In addition to the feedback loop, a resistor 460 also connects between the inverting input of operational amplifier 454 and ground. The output signal from buffer amplifier 179 is coupled to output terminal 462 through a coupling capacitor 464.

Turning now to the portion of the circuitry that provides electric field sensing capability, the electric field probes 172 are shown connected to the input circuitry of the buffer amplifier 174. Specifically, the electric field probes connect to a resistor 466 that is shunted across the input terminals 468 and 470 of buffer amplifier 174. One end of resistor 466 connects to ground, with the opposite end connecting to the non-inverting input of operational amplifier 472. Buffer amplifier 174 is of a conventional configuration having a feedback network extending between the operational amplifier output and its inverting input. The feedback loop comprises a parallel resistor and capacitor network consisting of capacitor 474 and resistor 476. In addition, a resistor 478 connects between the inverting input of operational amplifier 472 and ground. The output of buffer amplifier 174 is coupled to frequency selective amplifier 176 by a coupling capacitor 480.

Frequency selective amplifier 176 is an active filter utilizing an operational amplifier 482. A frequency determinative network connects to the inverting input of operational amplifier 482, which network determines the center frequency and the band width of the filter. The frequency determining network comprises a resistor 484 extending from the output of operational amplifier 482 directly to the inverting input thereof. In addition, a capacitor 486 connects to the inverting input of operational amplifier 482. An input resistor 488 connects between coupling capacitor 480 and the capacitor 486 with the junction of resistor 488, with capacitor 486 serving as the junction point to which the remaining components of the frequency determinative network connect. Capacitor 490 connects to the output of the operational amplifier 482 and shunts across resistor 484 and capacitor 486. Finally, a series connection of resistor 492 and potentiometer 494 connects to the junction of resistor 488 and capacitor 486. Potentiometer 494 is operative to adjust the center frequency of the band pass frequency selective filter 176. A biasing resistor 496 connects between the non-inverting input of operational amplifier 482 and ground. Finally, filter capacitors 498 and 499 connect to the positive voltage bus and the negative voltage bus, respectively.

Figure 17:
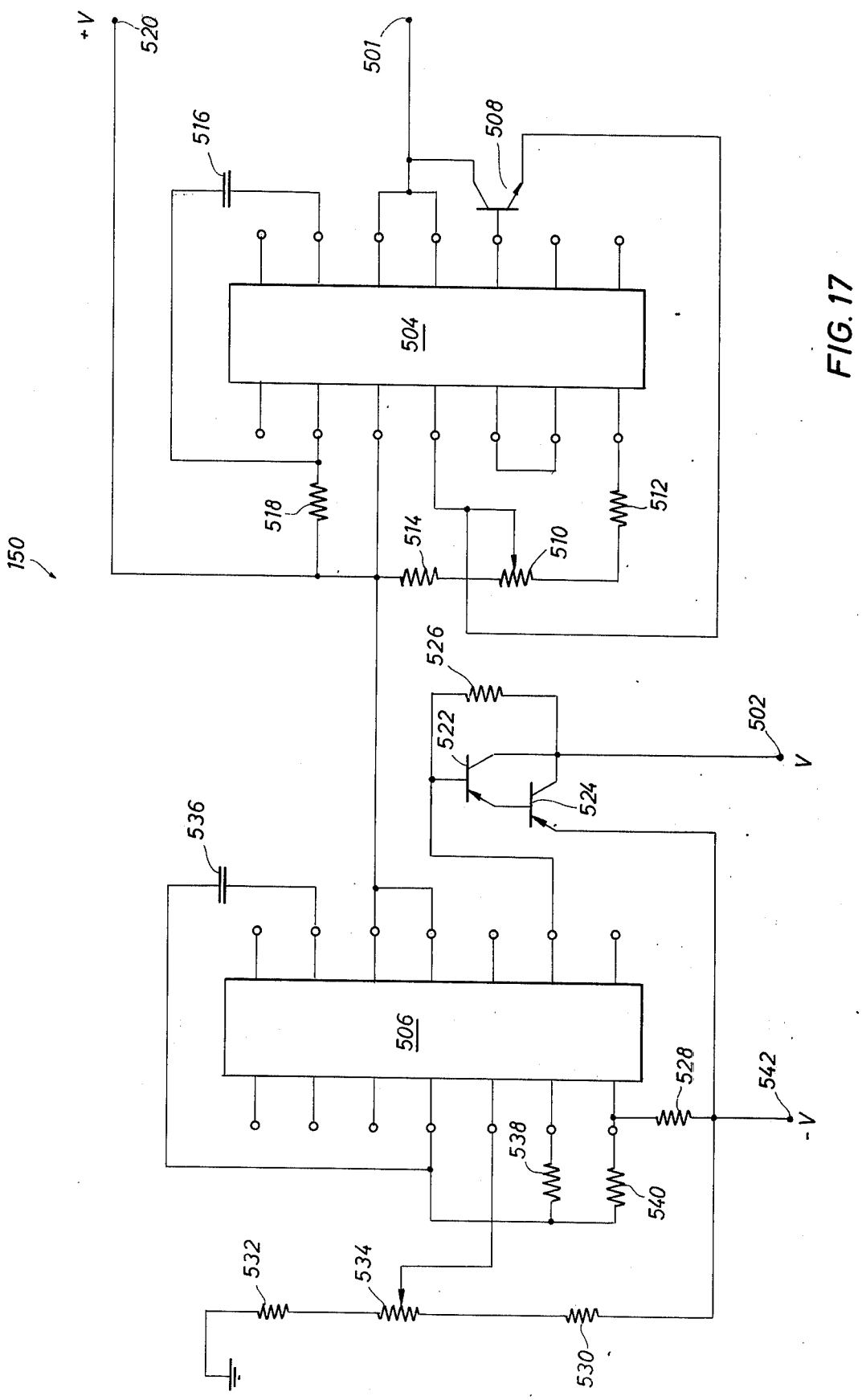
FIG. 17 is a schematic diagram of a voltage regulator suitable for the regulation of the subsurface power supply voltages.

Referring next to FIG. 17, a suitable voltage regulator circuit is shown for providing both regulated positive voltage and regulated negative voltage of preferably about 8.5 volts each. Unregulated power from the surface power supply, both +12 volts power and −12 volts power, is supplied to the voltage regulator circuit 150 at terminals 501 and 502, respectively. The voltage regulator circuit 150 comprises an integrated circuit voltage regulator 504 for the positive voltage regulator portion, and a separate integrated circuit 506 for the negative voltage regulator.

Referring first to the positive voltage regulator circuitry, the +12 volts input voltage from the surface power supply is applied to the circuit 504. An NPN transistor 508 has its collector connected to the incoming power, and its base lead connected to the output terminal of the integrated circuit 504. The emitter of transistor 508 is connected to the inverting input terminal of circuit 504, which input is also connected to the wiper of potentiometer 510. A resistor 512 connects between one side of potentiometer 510 and the negative voltage input of circuit 504. Another resistor 514 connects between the opposite side of potentiometer 510 and the current sense terminal on circuit 504. A frequency compensation capacitor 516 is provided between the current limit terminal on circuit 504 and the frequency compensation terminal. In addition, a resistor 518 is placed between the current limit terminal and the current sense terminal on circuit 504. The regulated positive voltage output is taken at the junction of resistors 514 and 518, and is available from terminal 520.

Referring now to the negative voltage regulator portion, the voltage input to integrated circuit 506 is the regulated positive voltage available from the positive voltage regulator circuitry. The unregulated negative voltage being supplied to terminal 502 from the surface power supply is further applied to a Darlington amplifier circuit comprised of transistors 522 and 524, both PNP transistors, specifically, the negative voltage is applied to the collectors of the devices. A resistor 526 is placed between the joined collectors of the transistors and the base lead of transistor 522. The base of transistor 522 is connected to the integrated circuit 506, and the emitter lead of transistor 524 is connected through resistor 528 to the negative voltage terminal on circuit 506. In addition, the emitter of transistor 524 connects to a resistor network comprised of resistors of 530, 532 and potentiometer 534, which network provides output voltage adjustment. The resistor network, specifically resistor 532, is connected to ground, and the wiper of potentiometer 534 is connected to the non-inverting input of integrated circuit 506. A capacitor 536 connects between the frequency compensation terminal and the inverting input terminal of integrated circuit 506. The inverting input terminal is further connected to the reference voltage and negative voltage terminals of circuit 506 through resistors 538 and 540 respectively. The regulated negative voltage is available at terminal 542.

Additional information concerning positive and negative voltage regulators of the type described above may be obtained by reference to the Linear Integrated Circuits Data book of National Semiconductor, particularly pages 1-45 through 1-49.

PARTS LIST

Oscillator Circuit (180)

| | | |
|---|---|---|
| Resistors | | |
| 184 | 4.7K | |
| 186 | 470Ω | |
| 188 | 4.7K | |
| 192 | 4.7K | |
| 198 | 10K | |
| Capacitors | | |
| 190 | .01μfd | |
| 194 | .01μfd | |
| Amplifiers | | |
| 182 | LM 108 | National Semiconductor |

D.C. Magnetometer (124, 128, 132, 134)

| | | |
|---|---|---|
| Resistors | | |
| 206 | 33K | |
| 208 | 22K | |
| 210 | 15K | |
| 218 | 1.0K | |
| 222 | 100K | |
| 226 | 1.5Ω | |
| 308 | | |
| 310 | | |
| 312 | 3.3K | |
| 314 | 100Ω | |
| 316 | 15K | |
| 320 | 100Ω | |
| 322 | 15K | |
| 330 | 50K | |
| 358 | 10K | |
| 362 | 1.5K | |
| 364 | 150Ω | |
| 368 | 2.0K | |
| 370 | 100K | |
| 372 | 1.0K | |
| 376 | 15K | |
| 378 | 120K | |
| 380 | 120K | |
| 382 | 50K | |
| 384 | 1.0Meg | |
| 402 | 100K | |
| 406 | 47K | |
| 414 | 1.0K | |
| 416 | 1.0K | |
| 418 | 100Ω | |
| 422 | 10K | |
| 424 | 2.0K | |
| 426 | 680Ω | |
| Capacitors | | |
| 202 | .1 μfd | |
| 212 | .1 μfd | |
| 224 | .1 μfd | |
| 302 | .1 μfd | |
| 318 | .1 μfd | |
| 324 | .1 μfd | |
| 366 | .1 μfd | |
| 374 | .01μfd | |
| 428 | 2.0 μfd | |
| 430 | .1 μfd | |
| 432 | 22μfd | |
| 434 | 22μfd | |
| Amplifiers | | |
| 204 | | National Semiconductor |
| 352 | | '' |
| 408 | | '' |
| Transistors | | |
| 214,216 MD6100 | | Motorola Complementary Pair |
| 304,306 MD6100 | | '' |
| 354,356 MD6100 | | '' |
| 410,412 MD6100 | | '' |

A.C. Field Sensing System

| | | |
|---|---|---|
| Resistors | | |
| 456 | 68K | |
| 460 | 1.0K | |
| 466 | 100K | |
| 476 | 68K | |
| 478 | 1.0K | |
| 484 | 68K | |
| 488 | 10K | |
| 492 | 270Ω | |
| 494 | 2.0K | |
| 496 | 220K | |
| Capacitors | | |
| 452 | | |
| 458 | 1200pf | |
| 464 | 2.0 μfd | |
| 474 | 1200pf | |
| 480 | 2.0 μfd | |
| 486 | .047μfd | |
| 490 | .047μfd | |
| 498 | 22μfd | |
| 499 | 22μfd | |
| Linear Circuits | | |
| 454 | LM108 | National Semiconductor |
| 472 | LM108 | '' |
| 482 | LM108 | '' |

Voltage Regulator (150)

| | | |
|---|---|---|
| Resistors | | |
| 510 | 2.0K | |
| 512 | 6.8K | |
| 514 | 470Ω | |
| 518 | 5K | |
| 526 | 2.2K | |
| 528 | 2.2K | |
| 530 | 3.3K | |
| 532 | 4.7K | |
| 534 | 2.0K | |
| 538 | 2.7K | |
| 540 | 2.7K | |
| Capacitors | | |
| 516 | 100pf | |
| 536 | 100pf | |
| Linear Circuits | | |
| 504 | LM723 | National Semiconductor |
| 506 | LM723 | '' |
| Transistors | | |
| 508 | 2N3054 | Motorola |
| 522 | MPS6523 | '' |
| 524 | 2N3740 | '' |

Referring to FIG. 18, there is illustrated one suitable device that may be used for the vertical reference sensor 152. The vertical reference sensor has primary importance in providing information as to the orientation of the tool housing 102 with respect to a vertical plane. Having information concerning the rotational orientation of the tool 100 will permit increased accuracy in determining the direction to a target magnetic body from the downhole tool.

The device illustrated in FIG. 18 is a mercury potentiometer sensor, which is in essence a transducer that provides a measurement of the angle of rotation of the tool housing about the longitudinal axis of the housing 102. The device is designed to permit the measurement of this angle irrespective of the borehole inclination. The technique illustrated involves a small ball of mercury 552 disposed for unrestricted movement in a circular, nonmetallic race 554. The mercury ball, due to the influence of gravity, will always move along the race seeking the lowest point. The mercury ball contacts a resistive element 554 on one side and contacts a metallic collector ring 556 on the other side. In essence, the mercury is acting in the same manner as the wiper of a potentiometer or variable resistor.

The mercury ball is constrained within the race in order to keep the ball from being broken up by shock and vibration. The ball is surrounded with a low friction material to provide a smooth surface which will not impede the free movement of the ball to the lowest point in the race. The resistive element should have a linear variation in resistance along its entire length to provide a linear response over the entire 360° range. In addition, the resistance material used must be physically compatible with the mercury ball in order that a good ohmic contact can be made.

The embodiment illustrated in FIG. 18 includes four contacts that define four quadrants, I, II, III and IV. Specifically, a positive voltage potential is applied to the resistive element at the zero-degree position. A negative voltage potential is applied to the resistive element 554 at 180° position, and a ground potential is applied to two locations along the resistive element 554 at the 90° position and at the 270° position.

FIG. 18A is a plot of the output voltage from a collector 556 as a function of the mercury ball position along the race. At the zero-degree position, that is where the apparatus reference plane is vertical and the reference mark of the apparatus is up, the mercury ball 552 will be at the bottom of the race. Consequently, little or no voltage drop will be experienced between the contact 558 and the mercury ball; and therefore, the voltage on the collector output lead 560 will be near the positive voltage supply potential. As the housing rotates counterclockwise, the mercury ball will move along the race in quadrant I. As it moves in this manner, the voltage observed at collector output terminal 560 will decrease linearly until finally, at the 90° position the output voltage will be zero volts. If rotation of the housing is continued throughout the full 360°, the output response will be as shown.

Alternatively, the vertical sensor may use only two contacts, that is only two voltage potentials need be attached to the resistive element. Again, a linear resistance as a function of rotation is necessary. It is further necessary that the two contacts be displaced a sufficient distance apart that the mercury ball can pass by the two contact points without shorting them together. By this method, the output voltage would be linear with rotation between, for example, zero degrees and 350°.

Additional approaches to the implementation of the vertical sensor would include a gyroscope disposed in the downhole tool to determine the orientation of the housing with respect to a geographical heading. A gyro benchmark reading would be taken at a known heading at the wellhead with subsequent readings taken throughout the survey related to the benchmark to determine orientation. Also a pendulum which is free to move within the housing could be used. If a pendulum were used, an optical type sensor might be the most advantageous. For example, the suspended mass could have coded apertures through which a light source could project a beam of light onto a photocell behind the plate. Photocell output would then be representative of the rotational orientation of the tool.

A similar reference sensor could be provided to determine changes in orientation of apparatus 100 by rotation about the X-axis. A sensor for performing the function of ascertaining housing inclination within the borehole would be placed perpendicular to the vertical reference sensor 152.

2. Surface Instrumentation Apparatus

The surface instrumentation is designed to receive, route and manipulate the data being provided by the subsurface field sensing apparatus. The surface instrument, in order to be compatible with the multiple sensor output subsurface tool, is a multi-channel instrument. Routing of data within the surface instrumentation is by mode switching and multiplexing. Manipulation of the data is carried out by a programable calculator receiving multiplexed digital data.

The surface instrumentation includes additional equipment such as power supplies, analog data recorders, and calculator peripheral devices. The peripheral devices could include a printer for supplying an immediate printout and a digital magnetic tape recorder for storing the data and results.

Figure 19:
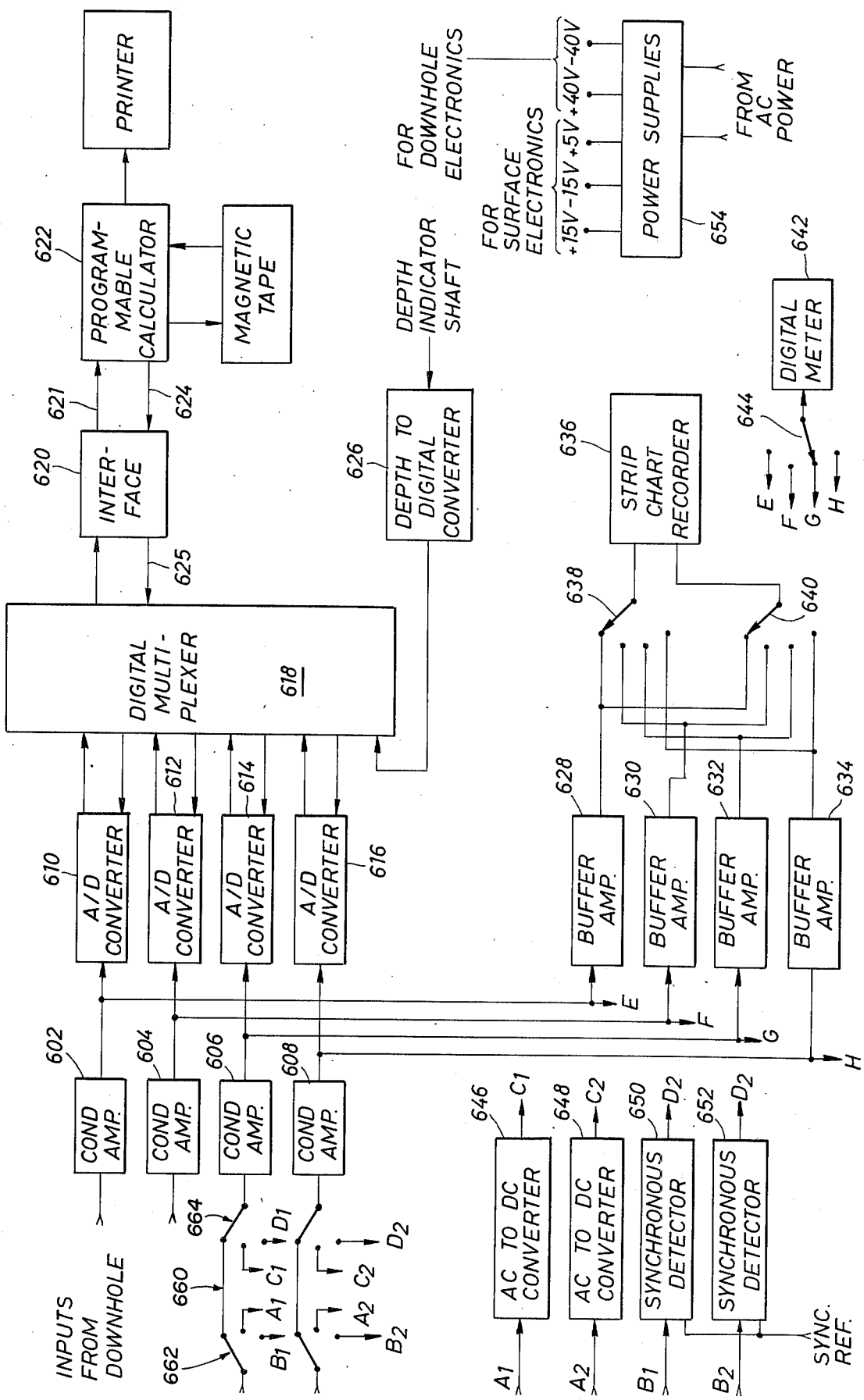
FIG. 19 is a block diagram of the surface instrumentation that receives the data acquired by the subsurface instrument.

Referring now to FIG. 19, there is shown a clock diagram for the surface instrumentation. The receiving portion of the surface instrument comprises a separate signal conditioning amplifier 602, 604, 606, 608 for each data channel. Since data is to be stored and analyzed in a digital programable calculator, the data must be converted from the analog form in which it is generated downhole into a compatible digital representation. To perform this function, a separate analog-to-digital converter 610, 612, 614, 616 is provided to receive the output of each signal conditional amplifier and digitize it. Programable calculator 622 operated with a single data bus, therefore requiring that a digital multiplexer 618 be utilized to route the multichannel data onto a single data bus to the calculator. An interface 620 is provided to link-up the digital multiplexer 618 and the programable calculator 622. The interface 620 receives control signals in one format over a control signal bus 624, and on the basis of the calculator input controls to it, the interface provides control signals of a format compatible with the digital multiplexer 618.

In addition to the digitized data from the field sensors, a digital representation of the depth at which each sampling of sensor output was taken is also provided to the multiplexer 618 for routing to programable calculator 622. Depth indication begins with the reading of a depth indicator shaft on the logging cable unit, which shaft turns a depth indicator 626 that provides a digital representation of the depth of the subsurface tool.

In addition to the digital processing portion of the surface instrumentation, analog signal plotting capability is provided. The analog signal available at the output of each signal conditioning amplifier is applied to a buffer amplifier 628, 630, 632, 634. The buffer amplifiers amplify the signal received to a sufficient level for driving a dual channel strip chart recorded 636. Two multiple position switches 638 and 634 are provided to enable each channel of the strip chart recorders 636 to be connected up to any one of the buffer amplifiers to monitor the data from any one of the field sensors. In addition, the outputs of the signal conditioning amplifiers can be applied to a digital volt meter 642 through a selector switch 644.

When the subsurface field sensing apparatus 100 is being operated in the so-called passive mode, the analog data derived from the D.C. magnetometers are applied directly to their respective signal conditioning amplifiers. However, if the system is being operated in the active mode, the A.C. field sensors are being used, the A.C. signals must be routed first through an AC-to-DC converter or a synchronous detector prior to being applied to the signal conditioning amplifiers. Use of one or the other will depend upon whether it is convenient to run a reference conductor to the surface instruments. Preferably, detectors 650 and 652 are Princeton Applied Research Lock-In Amplifiers, Model 122. Assuming that the circumstances at hand permit, a reference signal is taken from the current source being used to excite the target well. The reference signal is applied to the synchronous detectors to permit phase lock operation. Synchronous detection of the sensor data results in a quasi-static output which is positive for in-phase signals and negative for out-of-phase signals, thereby eliminating ambiguity of direction.

A switching network 660 is provided to permit the routing of the A.C. signals to either AC-to-DC converters 646 and 648 or to synchronous detectors 650 and 652. Switching network 660 comprises two multiple position double pole switches 662 and 664. The incoming A.C. signal is applied to the terminals of switch 662. Then, according to the particular mode of operation the signal of each channel will be applied to the appropriate AC-to-DC converter or synchronous detector. The input leads to the signal conditioning amplifiers 606 and 608 are connected to switch 664. Also, depending upon the mode of operation, switch 664 is positioned to connect each signal conditioning amplifier input to either an AC-to-DC converter or a synchronous detector.

It is noted that because of the limited number of conductors available in the logging cable changes must also be made in the wiring of the subsurface field sensing apparatus in order to connect the A.C. magnetometer sensor circuitry or the electric field probe sensor circuitry to the subsurface tool output connector.

C. SURVEY SYSTEM OPERATION

In performing target surveying involving the determination of the range and direction to the desired target well from a location along an off-vertical relief well borehole with the apparatus of the present invention, it is necessary to first select the passive or active mode of operation. If the first well is not burning, it may be possible to excite the well casing with an alternating electric current to generate a magnetic field about the casing, which would then serve as a magnetic field target for the subsurface field sensing apparatus.

Assuming that the active mode is selected, a cathodic generator, typically a three-phase, full-wave bridge, will be electrically coupled to the well casing, and a ground lead taken to an adjacent well to provide a return path for the current. Since the ripple frequency of the rectified AC is six times the fundamental frequency, the AC field sensing systems in the subsurface tool must have a maximum response at the sixth harmonic of the power generator. Rather than using 360 Hz as the peak response frequency, the AC magnetic field sensor 178 (FIG. 8) and the frequency selective amplifier 176 (FIG. 8) should be tuned to 324 Hz to minimize the interference and false information which maybe caused by 60 Hz power systems operating nearby. The reduction of this peak response requires that the power generator governor be regulated to generate 54 Hz rather than 60 Hz. This frequency adjustment is within the range of commonly available generating systems.

If enough current can be driven through the well casing to set up a magnetic field, the AC magnetic field sensor will be used. However, if sufficient current leakage through the casing to ground is being experienced, it may be necessary to use the electric field probes and detect the electric field radially emanating from the surface of the casing.

With the generator exciting the well casing, the subsurface tool is lowered down the borehole being drilled, and a survey is made. Based upon the data provided by the subsurface instrument, the course of the borehole is altered. The direction of drilling is altered until the subsurface field sensing apparatus determines that the borehole is aligned in the direction of the target casing. In the case of the electric field sensor, a maximum voltage gradient will be detected when the electrode sensors are aligned in the direction of the target and when a minimum gradient is detected, the line through the electrodes is perpendicular to the direction to the target. If the AC magnetic sensor is being used, alignment of the sensor axis with the direction of the target will exist when the output of the sensor is at zero.

It is also important to note with regard to FIG. 17 illustrating the surface instrumentation apparatus that in the active mode of operation in order to be able to determine the direction in which the AC sensor is aimed it is necessary to take a signal from the generator exciting the casing and compare it with the signal from the AC sensor. In the event that synchronous detection is used the signal would be applied to the sync reference input 653. If connections are made to provide proper polarities, the sensor output signal will result in a positive output is in-phase with the reference signal from the generator, then the sensor is pointed toward the target.

In most cases, it will not be possible to excite the casing because of a burning fire at the mouth of the well, which fire can easily spread over a large area. Operation of the survey system under such conditions will have to be perfomed in the passive mode with the DC magnetometers in the apparatus being used to detect the remanent magnetization of the casing in the target well.

As mentioned previously, in order to orient the apparatus with respect to the surface geographical coodinates, it is necessary to know the field intensity, the direction with respect to magnetic North, and the dip angle of the earth's field. All of these will be unique values depending upon the exact location on the earth's surface where drilling is to take place.

To begin a survey, the subsurface field sensing apparatus is lowered into the borehole suspended from a seven conductor logging cable secured to the connector at the top of the tool. The apparatus is stopped at a location in the borehole sufficiently far away from the target such that only the earth's field is detected on the magnetic sensors. By measuring the vector components of the earth's magnetic field in the X, Y, Z coordinate axis system of the apparatus in the manner previously discussed, the slope and azimuth of the borehole can be determined. Thus, the orientation of the tool with respect to the surface drilling unit can also ascertained.

After the orientation of the borehole has been determined, which orientation does not change radically with distance due to the inability of the drill string to bend at a sharp radius, and the subsurface apparatus has been checked out and determined to be functioning properly, the subsurface instrument is lowered continuously down the borehole. As the instrument is being lowered, measurements of the magnetic field intensity components are made. The surface instrumentation digitizes the measurements and supplies them to the programmable calculator which organizes and analyzes the data. The data may be recorded on magnetic tape for later recall and processing. The processing of data will be in accordance with the equations for ranging outlined previously herein and conventional vector analysis techniques. By performing machine calculations on the data, answers can be displayed on the printer giving the range and direction to the target magnetic source from particular depth locations along the borehole. A print out of data relating this information for each depth location along the borehole provides an indication as to whether the drilling operations are proceeding in a proper direction or will need to be corrected in accordance with the correction equations outlined in the discussion with regard to the diagram of FIG. 5.

As noted in the discussion of making elevation and azimuth correction for the borehole, rotation of the subsurface instrument about its longitudinal axis will affect the readings obtained by the X-axis and Y-axis sensors. Practically speaking, the apparatus can rotate without restriction, or it can be partially restricted from free rotation by using standoffs. The standoffs would comprise four rubber bars equally spaced around the circumference of the housing to restrict rotary motion until the tension in the cable can override the restraining influence of the bars. Rotation of the apparatus will generally not be excessive. However, the problem is greatly diminished by simultaneously sampling and retaining sensor outputs as is performed by the surface instruments.

On the basis of the elevation and azimuth correction angles, the drilling of the relief well is continued along a new path. After drilling has progressed an appropriate distance which is not an extremely large distance with respect to the range of target as determined by the last survey, drilling is interrupted and the subsurface field sensing apparatus may again be lowered into the borehole to make a new survey to determine target range and direction. If a near intercept of the target is made, the borehole may have to be plugged and partially redrilled to place the trajectory of the relief well borehole sufficeintly near the target. If redrilling is required, the new trajectory can be planned more accurately, with the new knowledge of the target well position.

Proper operation of the static field sensing system in the subsurface instrument to yield optimum accuracy depends upon precise orientation of the mechanical and magnetic axes of the four DC magnetometer sensor cores. As discussed earlier, each sensor has a cosine response pattern, and a three-dimensional visualization of this pattern would be of a pair of spheres joined together. The axis of maximum sensitivity is a line through the diameter of the spheres and the point of their contact. Also a null axis can be defined in a plane perpendicular to the axis of maximum sensitivity and containing the point of contact of the spheres. Although rotation about the axis of maximum sensitivity theoretically will not affect the sensor response, if the mechanical and magnetic axes do not correspond, then the sensor's axis of maximum sensitivity will define a cone as the sensor is turned about its mechanical axis. Accordingly, variations in the magnetic field being detected will also result. The amount of misalignment of this type can be determined and appropriate correction factors can be applied to the raw data supplied by the sensors.

In addition to the problem of axis misalignment in the individual sensors, there is also the problem of maintaining the sensors at a mutually perpendicular disposition. To correct for this problem, the four sensors should be mechanically aligned as closely as possible, with the misalignment being measured in terms of its response output when placed in precisely defined magnetic fields. Correction factors are also determined for this type of misalignment, which correction factors are applied to the raw data obtained from the subsurface instrument.

A final problem involves adjusting the axial magnetic sensors of the subsurface apparatus to have their magnetic axes coincide with the centerline axis of the cylindrical outer housing. The most convenient solution to this problem is to carefully align the mechanical axis of the axial magnetic sensors with the housing and rely on the correction factor mentioned above that corrects for sensor magnetic axis misalignment with respect to the mechanical axis of the sensor.

Although no techniques have been described in detail for carrying out the calculations for target range and target direction determination, anyone skilled in the computer art can program a computer to solve the equations provided herein and to apply the techniques of vector analysis to the acquired data. Although the calculations may be carried out by a hand-held calculator such as an HP-65, a calculator such as a Hewlett-Packard 9815A is preferred. Programs for either instrument may be formulated from the manuals accompanying those instruments.

The foregoing description of the invention has been directed to a particular preferred embodiment of the present invention for purposes of explanation and illustration. It will be apparent, however, to those skilled in this art that many modifications and changes in the apparatus and method may be made without departing from the scope and spirit of the invention. It is, therefore, intended that the following claims cover all equivalent modifications and variations as fall within the scope of the invention as defined by the claims.

What is claimed is:

1. A method of directional subsurface drilling of a first borehole to intersect a second well containing a ferromagnetic target, comprising the steps of:
    measuring the components of the earth's magnetic field along orthogonal axes at a first location in the first borehole sufficiently remote from the target to be unaffected by any magnetic field of the target;
    measuring components of the total magnetic field along orthogonal axes at a second location in the first borehole sufficiently proximate the target to detect the magnetic field of the target superimposed upon the earth's field;
    determining the direction of the superimposed magnetic field of the target from the second location using the measurements of the components of the earth's magnetic field;
    measuring the component of the total field in the direction of the axis of the first borehole at a plurality of locations in the first borehole to determine the gradient of the target field in the direction of the axis of the first borehole;
    determining the range of the target from one of said plurality of locations using the measurements of the component of the total field in the direction of the axis of the first borehole; and
    orienting the direction of drilling of the first borehole in the direction of the target magnetic field from a position in the first borehole from which the second well may be conveniently intercepted based upon the target range and direction determinations.

2. The method of claim 1 wherein the measurements of the component of total magnetic field intensity in the direction of the axis of the first borehole are made by two aligned magnetic field sensors spaced apart by a predetermined separation, $\Delta r$.

3. The method of claim 1 wherein the determination of the direction of the adjacent well involves measuring three magnetic field components, and resolving the components into a resultant vector indicative of the direction to the adjacent well.

4. The method of claim 1 including the steps of:
    interrupting the drilling of the first borehole;

redetermining direction and range of the target from a third location in the first borehole;

reorienting the course of drilling of the off-vertical relief well borehole; and periodically repeating the steps in sequence until the first borehole intersects the second well.

5. The method of claim 1 wherein the step of orienting the course of drilling involves the determination of an azimuth correction angle and an elevation correction angle using the difference in the component measurements along orthogonal axes of the total field at said second location and the measured components of the earth's magnetic field.

6. The method of claim 1 wherein the measurements of the component of total magnetic field intensity in the direction of the axis of the first borehole are made at more than two locations of predetermined separation along the axis of the first borehole; and the determination of target magnetic field intensity gradient is made over each separation between adjacent pairs of locations by forming a ratio ($\Delta H/\Delta r$) of the difference in adjacent measurements of total magnetic field intensity component in the direction of the axis of the borehole, $\Delta H$, to the predetermined separation, $\Delta r$.

7. The method of claim 6 wherein the determination of range involves:

determining an average value of the component of target magnetic field intensity in the direction of the axis of the first borehole for each separation using adjacent pairs of measurements;

forming ratios $H/(\Delta H/\Delta r)$ of average target magnetic field intensity component, H, in the direction of the axis of the first borehole to target magnetic field intensity gradient, $\Delta H/\Delta r$, in the direction of the axis of the borehole using corresponding measurements for each separation;

substituting the ratios $H/\Delta H/\Delta r$ for adjacent separations in the equation $$\frac{\frac{H_1}{\Delta H_1/\Delta r}}{\frac{H_2}{\Delta H_2/\Delta r}} = \frac{r_1}{r_2} = \frac{r + (\frac{\Delta r}{2})}{r + (\frac{3\Delta r}{2})}$$

where $H_1$ is the value of H over a first separation, $H_2$ is the value of H over a second, adjacent separation, $\Delta H_1/\Delta r$ is the gradient $\Delta H/\Delta r$ over the first separation, $\Delta H_2/\Delta r$ is the gradient $\Delta H/\Delta r$ over the second, adjacent separation, $r_1$ is the range to the target from the first separation, $r_2$ is the range to the target from the second, adjacent separation; and determining from the equation the value of the range, r.

8. A method of directional subsurface drilling of an off-vertical relief well borehole to intersect an adjacent well having remanent magnetization, comprising the steps of:

running magnetic field sensing apparatus into the relief well borehole, stopping at a location therein sufficiently far from the adjacent well that the magnetic field existing about the well is not substantially detected and measuring components of the earth's magnetic field along three mutually perpendicular axes;

determining relief well borehole azimuth and slope angles with referenct to the earth's magnetic field;

lowering said magnetic field sensing apparatus and simultaneously measuring components of the total magnetic field along three mutually perpendicular axes at a plurality of spaced locations of defined separation along the relief well borehole, with one of the measured components being that which is in the direction of the relief well borehole;

determining the direction to the adjacent well by measuring three components of the total magnetic field, subtracting the measured component values of the earth's field and resolving the remaining quantities of the components into a resultant vector;

determining the gradient of the remanent magnetic field intensity in the direction of the relief well borehole over defined portions of the relief well;

determining the range from a location along the relief well borehole to the adjacent well using the measurements of the component total magnetic field intensity in the direction of the relief well borehole and the gradient of the remanent magnetic field intensity in the direction of the relief well borehole; and orienting the course of drilling of the off-vertical relief well borehole based upon the range and direction of the adjacent well from the relief well borehole.

9. The method of claim 8 wherein the step of determining borehole azimuth and slope involves measuring components of the earth's magnetic field to determine borehole orientation with respect to the dip and direction of the earth's magnetic field.

10. The method of claim 8 wherein the step of determining range to the adjacent well involves:

determining an average value (H) of remanent magnetic field intensity component in the direction of the relief borehole for each separation between adjacent measurement locations, said average magnetic field intensity component being determined using adjacent pairs of measurements;

determining an average magnetic field intensity gradient ($\Delta H/\Delta r$) for the remanent field in the direction of the relief borehole for each separation between adjacent measurement locations, said average magnetic intensity gradient being determined by dividing the difference in magnitude between adjacent pairs of remanent magnetic field intensity components by the separation between the adjacent locations at which the intensity measurements are made; and forming ratios of average magnetic field intensity of the remanent field component in the direction of the relief borehole to average remanent magnetic field intensity gradient ($H/\Delta H/\Delta r$) using the values of each determined for respective corresponding separations.

11. The method of claim 10 further involving:

(a) substituting the ratios into the equation $$\frac{H}{\Delta H/\Delta r} = \frac{-r}{n}$$

where $H/\Delta H/\Delta r$ is the gradient, $r$ is the range, and $n$ is the fall-off rate of intensity with distance;

(b) approximating a value of $n$; and (c) determining the range, $r$, to the adjacent well.

12. A method of surveying the range to a subterranean body having remanent magnetization from an adjacent borehole comprising the steps of:

measuring the component of the total existing magnetic field in the direction of the borehole at a plurality of locations along the borehole;

determining the gradient of the magnetic field emanating from the subterranean body in the direction of the borehole; and determining the range of the subterranean body from one of said plurality of locations along the borehole using the gradient determination and the measured component of the magnetic field.

13. The method of claim 12 wherein the measurements of the component of total magnetic field intensity in the direction of the borehole are made at locations of predetermined separation along the axis of the borehole; and the determination of the gradient of the intensity of the magnetic field of the subterranean body is made as separate determinations over each separation between adjacent pairs of locations by forming a ratio $(\Delta H/\Delta r)$ of the difference in adjacent measurements of total magnetic field intensity component in the direction of the borehole to the predetermined separation, $\Delta r$.

14. The method of claim 13 wherein the determination of range involves:

determining an average value of the component of target magnetic field intensity in the direction of the borehole for each separation using adjacent pairs of measurements;

forming ratios $H/(\Delta H/\Delta r)$ of average target magnetic field intensity component, $H$, in the direction of the borehole to target magnetic field intensity gradient, $\Delta H/\Delta r$, in the direction of the axis of the borehole using corresponding measurements for each separation;

substituting the ratios $H/\Delta H/\Delta r$ for adjacent separations in the equation $$\frac{\frac{H_1}{\Delta H_1/\Delta r}}{\frac{H_2}{\Delta H_2/\Delta r}} = \frac{r_1}{r_2} = \frac{r + (\frac{\Delta r}{2})}{r + (\frac{3\Delta r}{2})}$$

where $H_1$ is the value of $H$ over a first separation, $H_2$ is the value of $H$ over a second, adjacent separation, $\Delta H_1/\Delta r$ is the gradient $\Delta H/\Delta r$ over the first separation, $\Delta H_2/\Delta r$ is the gradient $\Delta H/\Delta r$ over the second, adjacent separation, $r_1$ is the range to the target from the first separation, $r_2$ is the range to the target from the second, adjacent separation; and determining from the equation the value of the range, $r$.

15. The method of claim 14 wherein the measurements of the component of total magnetic field intensity in the direction of the axis of the borehole are made by two aligned magnetic field sensors spaced apart by a predetermined separation, $\Delta r$.

16. A method of directional subsurface surveying from a borehole to locate a subterranean ferromagnetic target, comprising the steps of:

measuring the components of the earth's magnetic field along orthogonal axes at a first location in the borehole sufficiently remote from the target to be unaffected by any magnetic field of the target;

measuring components of the total magnetic field along orthogonal axes at a second location in the borehole sufficiently proximate the target to detect the magnetic field of the target superimposed upon the earth's field;

determining the direction of the superimposed magnetic field of the target from the second location using the measurements of the components of the total magnetic field and the measurements of the components of the earth's magnetic field;

measuring the component of the total field in the direction of the axis of the borehole at a plurality of locations in the borehole to determine the gradient of the target field in the direction of the axis of the borehole; and determining the range of the target from one of said plurality of locations using the measurements of the component of the total field in the direction of the axis of the first borehole.

17. The method of claim 16 wherein the measurements of the component of total magnetic field intensity in the direction of the axis of the borehole are made by two aligned magnetic field sensors spaced apart by a predetermined separation, $\Delta r$.

18. The method of claim 16 wherein the determination of the direction to the target involves measuring three magnetic field components, and resolving the components into a resultant vector indicative of the direction to the adjacent well.

19. The method of claim 16 wherein the measurements of the component of total magnetic field intensity in the direction of the axis of the borehole are made at more than two locations of predetermined separation along the axis of the borehole; and the determination of target magnetic field intensity gradient is made over each separation between adjacent pairs of locations by forming a ratio $(\Delta H/\Delta r)$ of the difference in adjacent measurements of total magnetic field intensity component in the direction of the axis of the borehole to the predetermined separation, $\Delta r$.

20. The method of claim 19 wherein the determination of range involves:

determining an average value of the component of target magnetic field intensity in the direction of the axis borehole for each separation using adjacent pairs of measurements;

forming ratios $(H/\Delta H/\Delta r)$ of average target magnetic field intensity component, $H$, in the direction of the axis of the borehole to target magnetic field intensity gradient, $\Delta H/\Delta r$, in the direction of the axis of the borehole using corresponding measurements for each separation;

substituting the ratios $H/\Delta H/\Delta r$ for adjacent separations in the equation $$\frac{\frac{H_1}{\Delta H_1/\Delta r}}{\frac{H_2}{\Delta H_2/\Delta r}} = \frac{r_1}{r_2} = \frac{r + (\frac{\Delta r}{2})}{r + (\frac{3\Delta r}{2})}$$

where
- $H_1$ is the value of H over a first separation,
- $H_2$ is the value of H over a second, adjacent separation,
- $\Delta H_1/\Delta r$ is the gradient $\Delta H/\Delta r$ over the first separation,
- $\Delta H_2/\Delta r$ is the gradient $\Delta H/\Delta r$ over the second, adjacent separation,
- $r_1$ is the range to the target from the first separation,
- $r_2$ is the range to the target from the second, adjacent separation; and determining from the equation the value of the range, $r$.

21. A directional subsurface surveying from a borehole to locate a subterranean ferromagnetic target, comprising the steps of:
  measuring the components of the earth's magnetic field along orthogonal axes at a first location in the borehole sufficiently remote from the target to be unaffected by any magnetic field of the target;
  measuring components of the total magnetic field along orthogonal axes at a second location in the borehole sufficiently proximate the target to detect the magnetic field of the target superimposed upon the earth's field;
  determining the direction of the superimposed magnetic field of the target from the second location using the measurements of the components of the total magnetic field and the measurements of the earth's magnetic field;
  measuring one component of the total field at a plurality of locations along the borehole to determine the rate of change of the target field with distance down the borehole; and
  determining the range of the target from one of said plurality of locations using the measurements of the component of the total field in the direction of the axis of the first borehole.

22. The method of claim 21 wherein the determination of the direction to the target involves measuring three magnetic field components, and resolving the components into a resultant vector indicative of the direction to the adjacent well.

23. The method of claim 21 wherein the measurements of the component of total magnetic field intensity are made at more than two locations of predetermined separation along the axis of the borehole; and the determination of target magnetic field intensity gradient is made over each separation between adjacent pairs of locations by forming a ratio ($\Delta H/\Delta r$) of the difference in adjacent measurements of total magnetic field intensity component to the predetermined separation, $\Delta r$.

24. The method of claim 23 wherein the determination of range involves:
  determining an average value of the component of target magnetic field intensity for each separation using adjacent pairs of measurements;
  forming ratios ($H/\Delta H/\Delta r$) of average target magnetic field intensity component, H, to target magnetic field intensity gradient, $\Delta H/\Delta r$, using corresponding measurements for each separation;
  substituting the ratios $H/\Delta H/\Delta r$ for adjacent separations in the equation $$\frac{\frac{H_1}{\Delta H_1/\Delta r}}{\frac{H_2}{\Delta H_2/\Delta r}} = \frac{r_1}{r_2} = \frac{r + (\frac{\Delta r}{2})}{r + (\frac{3\Delta r}{2})}$$

where
- $H_1$ is the value of H over a first separation,
- $H_2$ is the value of H over a second, adjacent separation,
- $\Delta H_1/\Delta r$ is the gradient $\Delta H/\Delta r$ over the first separation,
- $\Delta H_2/\Delta r$ is the gradient $\Delta H/\Delta r$ over the second, adjacent separation,
- $r_1$ is the range to the target from the first separation,
- $r_2$ is the range to the target from the second, adjacent separation; and determining from the equation the value of the range, $r$.

25. A magnetic field sensing apparatus for disposition in a borehole to locate a subterranean magnetic body exhibiting a static magnetic field, comprising:
  an outer housing or non-magnetic material;
  a pair of mutually perpendicular radially oriented magnetic field sensors disposed within said housing;
  a pair of aligned axial magnetic field sensors spaced apart a predetermined separation within said housing and oriented perpendicular to said radial magnetic sensors;
  said axial and radial magnetic sensors measuring components of the magnetic field along orthogonal axes.

26. The apparatus of claim 25 wherein the field sensing apparatus further comprises a vertical sensor disposed within said housing for indicating the degree of rotation of said housing about its longitudinal centerline axis.

27. The apparatus of claim 25 wherein the field sensing apparatus further comprises a voltage regulator circuit disposed within said housing for receiving unregulated power and supplying regulated power to said magnetic field sensors.

28. The apparatus of claim 25 wherein said housing comprises:
  an elongate cylindrical sleeve;
  a nose cone secured to the forward end of said sleeve; and
  a multi-conductor connector secured to the rear of said sleeve.

29. The apparatus of claim 28 wherein said axial magnetic sensors and said radial magnetic sensors are mounted on a frame having four elongate stringers extending between said connector and the forward end of said sleeve proximate the nose cone.

30. The apparatus of claim 25 wherein said radial and axial magnetic field sensors exhibit a cosine response.

31. The apparatus of claim 30 wherein each of said magnetic field sensors comprises:
  a magnetic sensor core element;
  a core driver circuit providing a driving current to said core element;
  a detector circuit for receiving an output signal from said core element;
  a servo-driver circuit coupled to said detector circuit through null balancing means;

a feedback line from the output of said servo-driver to said core element;

said null balancing means being operable through said feedback line to reduce error in the output of said sensor element; and an output amplifiers coupled to the servo-driver circuit.

32. The apparatus of claim 31 wherein said core driver circuit provides a clipped sine wave waveform to said core element.

33. The apparatus of claim 31 further comprising an oscillator circuit connected to the core driver circuit of each magnetic field sensor.

34. The apparatus of claim 33 wherein said core driver circuit comprises:

an amplifier circuit having an input terminal that is ac coupled to the output terminal of the oscillator circuit, said amplifier having a gain greater than unity; and a push-pull emitter follower current amplifier ac coupled to said amplifier circuit comprising first and second transistors.

35. The apparatus of claim 33 wherein said magnetic sensor core element comprises:

a toroid forming a primary winding;
a bobbin of ferromagnetic material having an opening therein for receiving said toroid; and
a coil of wire wound about said bobbin to form a secondary winding.

36. The apparatus of claim 33 wherein said detector circuit comprises:

a push-pull emitter follower circuit having first and second transistors; and
said null balancing means comprises a potentiometer operably connected to the emitters of said first and second transistors.

37. The apparatus of claim 33 wherein said servo-driver circuit comprises:

an amplifier having first and second input terminals, and an output terminal;
first and second transistors arranged in a Darlington amplifier configuration with the base lead of said first transistor being coupled to the output terminal of said amplifier;
said feedback line connecting to the junction formed by the collector of said first transistor and the emitter of said second transistor and comprising variable resistance means; and
a network for setting the gain of said amplifier connecting between the collector of said first transistor and an input terminal of said amplifier.

38. The apparatus of claim 33 wherein said output amplifier comprises:

a gain potentiometer having a first leg connected to said servo-driver, a second leg connected to a supply of electrical power, and a wiper;
an amplifier having a first input lead connected to the wiper of said gain potentiometer, a second input lead and an output terminal;
a push-pull emitter follower circuit connected to the output terminal of said amplifier comprising first and second transistors; and
a network for setting the gain of said amplifier connecting between the junction of the emitters of the transistors and the second input lead of said amplifier.

39. In a magnetic field sensing apparatus suitable for disposition in a subterranean borehole to perform a survey of the range to a subterranean ferromagnetic target body exhibiting a magnetic field, the improvement comprising:

first and second magnetic field sensors spaced apart by a predetermined separation and oriented to have their axes of maximum sensitivity substantially aligned with one another and disposed substantially parallel with the axis of the borehole.

40. The apparatus of claim 39 wherein said first and second magnetic field sensors exhibit a cosine response when rotated about an axis of rotation that is perpendicular to the axis of maximum sensitivity.

41. The apparatus of claim 39 wherein each of said first and second magnetic field sensors comprises:

a magnetic sensor core element;
a core driver circuit providing a driving current to said core element;
a detector circuit for receiving an output signal from said core element;
a servo-driver circuit coupled to said detector circuit through null balancing means;
a feedback line from the output of said servo-driver to said core element;
said null balancing means being operable through said feedback line to reduce error in the output of said sensor element; and
an output amplifiers coupled to the servo-driver circuit.

42. A survey system for determining the range and direction to a subterranean ferromagnetic body exhibiting a magnetic field from a location within an adjacent subterranean borehole; which comprises:

subsurface magnetic field sensing apparatus for disposition in the adjacent borehole, said apparatus having magnetic sensors for measuring components of a magnetic field along orthogonal axes including a pair of aligned magnetic sensors oriented to make measurements of a component of the magnetic field in the direction of the borehole; and surface instrumentation operably coupled to said subsurface magnetic field sensing apparatus for determining range and direction from said apparatus to the subterranean body.

43. The system of claim 42 wherein said surface instrumentation comprises:

an analog-to-digital converter for digitizing the measurements made by said magnetic sensors;
an interface for converting the format of the digitized to a different format;
a calculator for receiving the converted digitized data and determining the range and direction; and
display means for presenting the range and direction determinations.

44. The system of claim 42 further comprising:

a digital multiplexer connected between said analog-to-digital converter and said interface for taking multi channel digital data and placing in onto a single data bus.

45. A magnetic field sensing apparatus for disposition in a borehole to locate a subterranean ferromagnetic body exhibiting a time-varying magnetic field comprising:

a sensor for detecting a time-varying magnetic field of a predetermined frequency; and
first and second static magnetic field sensors having axes of maximum sensitivity perpendicular to one another and perpendicular to the axis of the borehole, said first and second magnetic sensors being responsive to the earth's field.

46. The apparatus of claim 45 wherein said time-varying magnetic field sensor comprises:
   a parallel inductor and capacitor tuned to provide a maximum response when flux lines from said time-varying magnetic field of predetermined frequency couples said inductor; and
   an amplifier coupled to said inductor and capacitor combination for increasing the level of a signal produced by said combination.

47. An apparatus for disposition in a borehole to locate a subterranean electro-conductive body exhibiting a time-varying electric field comprising:
   an electric field potential probe for sensing the potential gradient of a time-varying electric field of a predetermined frequency;
   a frequency selective amplifier coupled to said electric field potential probe; and
   first and second magnetic field sensors having axes of maximum sensitivity perpendicular to one another and perpendicular to the axis of the borehole, said sensors being responsive to the earth's field.

48. A method of directional subsurface surveying from a borehole to locate a subterranean ferromagnetic target, comprising the steps of:
   a. establishing a time-varying magnetic field about said ferromagnetic target;
   b. detecting said time-varying magnetic field at a plurality of locations in the borehole to measure the intensity of said field at the locations;
   c. determining the intensity gradient of said time-varying field from the measurements of magnetic field intensity;
   d. determining the range of the target from one of said plurality of locations using the field intensity measurements obtained in step b and the intensity gradient determined in step c; and
   e. determining the direction to the target from the detection of said time-varying magnetic field made in step b.

49. The method of claim 48 wherein the measurements of the intensity of said time-varying magnetic field are made at more than two locations of predetermined separation along the axis of the borehole; and the determination of magnetic field intensity gradient is made over each separation between adjacent pairs of locations by forming a ratio ($\Delta H/\Delta r$) of the difference in adjacent measurements of magnetic field intensity to the predetermined separation, $\Delta r$.

50. The method of claim 49 wherein the determination of range involves:
   determining an average value of the magnetic field intensity for each separation using adjacent pairs of measurements;
   forming ratios $H/(\Delta H/\Delta r)$ of average magnetic field intensity, $H$, to magnetic field intensity gradient, $\Delta H/\Delta r$, using corresponding measurements for each separation;
   substituting the ratios $H_s/\Delta H_s/\Delta r$ for adjacent separation in the equation $$\frac{\frac{H_s}{\Delta H_s/\Delta r}}{\frac{H_{s+1}}{\Delta H_{s+1}/\Delta r}} = \frac{r_s}{r_{s+1}} = \frac{r + (\frac{\Delta r}{2})}{r + (\frac{3\Delta r}{2})} \; ; \text{and}$$

determining from the equation the value of the range, $r$.

* * * * *

UNITED STATES PATENT AND TRADEMARK OFFICE
CERTIFICATE OF CORRECTION

PATENT NO. : 4,072,200
DATED : February 7, 1978
INVENTOR(S) : Fred J. Morris et al It is certified that error appears in the above-identified patent and that said Letters Patent are hereby corrected as shown below:

IN THE ABSTRACT

Line 19, after "location" insert --of--.

IN THE SPECIFICATION

Column 1, line 13, delete "futher" and insert --further--.

Column 2, line 29, delete "form" and insert --from--.

IN THE CLAIMS

Claim 8, column 34, line 4, delete "referenct" and insert --reference--.

Claim 10, column 34, line 58, delete "(H/ΔH/Δr)" and insert $--\left(\frac{H}{\Delta H/\Delta r}\right)--$ Claim 11, column 34, line 68, delete "H/ΔH/Δr" and insert $--\frac{H}{\Delta H/\Delta r}--$.

UNITED STATES PATENT AND TRADEMARK OFFICE
CERTIFICATE OF CORRECTION

PATENT NO. : 4,072,200
DATED : February 7, 1978
INVENTOR(S) : Fred J. Morris et al It is certified that error appears in the above-identified patent and that said Letters Patent are hereby corrected as shown below:

IN THE CLAIMS

Claim 14, column 35, line 42, delete "H/ΔH/Δr" and insert -- $\frac{H}{\Delta H/\Delta r}$ --.

Claim 20, column 36, line 54, delete "(H/ΔH/Δr)" and insert -- $\left(\frac{H}{\Delta H/\Delta r}\right)$ --.

Claim 20, column 36, line 60 delete "H/ΔH/Δr" and insert -- $\frac{H}{\Delta H/\Delta r}$ --.

Claim 23, column 37, line 54, delete "66" and insert --Δ--.

UNITED STATES PATENT AND TRADEMARK OFFICE
CERTIFICATE OF CORRECTION

Page 3 of 4

PATENT NO. : 4,072,200
DATED : February 7, 1978
INVENTOR(S) : Fred J. Morris et al It is certified that error appears in the above-identified patent and that said Letters Patent are hereby corrected as shown below:

IN THE CLAIMS

Claim 24, column 37, line 57, delete "$(H/\Delta H/\Delta r)$" and insert -- $(\frac{H}{\Delta H/\Delta r})$ --.

Claim 24, column 37, line 61, delete "$H/\Delta H/\Delta r$" and insert -- $\frac{H}{\Delta H/\Delta r}$ --.

Claim 31, column 39, line 6, delete "amplifiers" and insert --amplifier--.

Claim 41, column 40, line 27, delete "amplifiers" and insert --amplifier--.

Claim 43, column 40, line 48, after "digitized" insert --data--.

Claim 44, column 40, line 57, delete "multi channel" and insert --multi-channel--.

UNITED STATES PATENT AND TRADEMARK OFFICE
CERTIFICATE OF CORRECTION

PATENT NO. : 4,072,200
DATED : February 7, 1978
INVENTOR(S) : Fred J. Morris et al It is certified that error appears in the above-identified patent and that said Letters Patent are hereby corrected as shown below:

IN THE CLAIMS

Claim 44, column 40, line 57, delete "in" and insert --it--.

Claim 50, column 42, line 24, delete "$Hs/\Delta H_s/\Delta r$" and insert -- $\dfrac{Hs}{\Delta H_s/\Delta r}$ --.

Signed and Sealed this

Eleventh Day of March 1980

[SEAL]

Attest:

*Attesting Officer*

SIDNEY A. DIAMOND

*Commissioner of Patents and Trademarks*